United States Patent
Russert et al.

(10) Patent No.: US 10,900,651 B2
(45) Date of Patent: Jan. 26, 2021

(54) METHOD FOR ALIGNING A LIGHT SPOT PRODUCED ON AN OPTICAL CONVERTER, DEVICE COMPRISING A LIGHT SPOT AND USE THEREOF, AND CONVERTER-COOLING BODY ASSEMBLY WITH METALLIC SOLDER CONNECTION

(71) Applicant: SCHOTT AG, Mainz (DE)

(72) Inventors: Hubertus Russert, Jugenheim (DE); Thomas Reichert, Wackernheim (DE); Jürgen Meinl, Hohenstein-Holzhausen (DE); Volker Hagemann, Klein-Winternheim (DE); Michael Kluge, Offenbach am Main (DE); Christian Rakobrandt, Landshut (DE); Alexander Penkert, Eich (DE)

(73) Assignee: SCHOTT AG, Mainz (DE)

( * ) Notice: Subject to any disclaimer, the term of this patent is extended or adjusted under 35 U.S.C. 154(b) by 119 days.

(21) Appl. No.: 15/899,564

(22) Filed: Feb. 20, 2018

(65) Prior Publication Data

US 2018/0180789 A1 Jun. 28, 2018

Related U.S. Application Data

(63) Continuation of application No. PCT/EP2016/069325, filed on Aug. 15, 2016.

(30) Foreign Application Priority Data

Aug. 17, 2015 (DE) .................. 10 2015 113 551
Aug. 17, 2015 (DE) .................. 10 2015 113 552
Aug. 17, 2015 (DE) .................. 10 2015 113 562

(51) Int. Cl.
*G03B 21/20* (2006.01)
*F21S 41/24* (2018.01)
(Continued)

(52) U.S. Cl.
CPC .............. *F21V 29/00* (2013.01); *F21S 41/24* (2018.01); *G02B 6/0008* (2013.01);
(Continued)

(58) Field of Classification Search
None
See application file for complete search history.

(56) References Cited

U.S. PATENT DOCUMENTS

| 4,932,989 A | 6/1990 | Presby |
| 6,774,341 B2 | 8/2004 | Ohta |

(Continued)

FOREIGN PATENT DOCUMENTS

| DE | 102006029203 | 12/2007 |
| DE | 102008012316 | 4/2009 |

(Continued)

OTHER PUBLICATIONS

English Translation of International Preliminary Report on Patentability dated Feb. 22, 2018 for corresponding PCT/EP2016/069325, 16 pages.

(Continued)

*Primary Examiner* — Jerry Rahll
(74) *Attorney, Agent, or Firm* — Ohlandt, Greeley, Ruggiero & Perle, L.L.P.

(57) ABSTRACT

A method and device for aligning a light spot of light exiting from at least one light guide on an optical converter are provided. The device includes a light guide from which light exits and is incident on an optical converter to at least a substantial fraction, thereby forming a light spot thereon, wherein the exit surface of the fiber has an angle relative to the longitudinal axis of the fiber which is different from 0°, and the position of the light spot on the converter is aligned by adjusting the angle. A conversion module as a part of a
(Continued)

lighting device is also provided that is operated with excitation light of a light source using a fiber-optical light guide.

10 Claims, 23 Drawing Sheets

(51) Int. Cl.
  *G02B 6/26* (2006.01)
  *F21V 8/00* (2006.01)
  *F21V 29/00* (2015.01)
  *F21K 9/64* (2016.01)
  *F21S 41/16* (2018.01)
  *F21S 41/176* (2018.01)

(52) U.S. Cl.
  CPC .......... *G03B 21/2046* (2013.01); *F21K 9/64* (2016.08); *F21S 41/16* (2018.01); *F21S 41/176* (2018.01); *G02B 6/262* (2013.01); *G03B 21/204* (2013.01)

(56) References Cited

U.S. PATENT DOCUMENTS

| | | |
|---|---|---|
| 2006/0092639 A1 | 5/2006 | Livesay |
| 2006/0137403 A1 | 6/2006 | Barr |
| 2008/0075406 A1 | 3/2008 | Kadomi |
| 2009/0296018 A1 | 12/2009 | Haerle |
| 2010/0246159 A1 | 9/2010 | Wada |
| 2010/0254153 A1 | 10/2010 | Hama |
| 2010/0295438 A1 | 11/2010 | Ott |
| 2011/0148280 A1 | 6/2011 | Kishimoto |
| 2011/0279007 A1 | 11/2011 | Kishimoto |
| 2011/0280033 A1 | 11/2011 | Kishimoto |
| 2012/0057364 A1 | 3/2012 | Kishimoto |
| 2012/0069593 A1 | 3/2012 | Kishimoto |
| 2012/0106178 A1 | 5/2012 | Takahashi |
| 2012/0106183 A1 | 5/2012 | Takahashi |
| 2013/0027951 A1 | 1/2013 | Takahashi |
| 2013/0107573 A1 | 5/2013 | Kadomi |
| 2013/0308332 A1 | 11/2013 | Woelfing |
| 2014/0169024 A1 | 6/2014 | Hager |
| 2015/0022151 A1 | 1/2015 | Tabatowski-Bush |
| 2015/0062953 A1 | 3/2015 | Woelfing |
| 2015/0292699 A1 | 10/2015 | Woelfing |
| 2016/0190418 A1 | 6/2016 | Inomata |
| 2016/0245494 A1 | 8/2016 | Weber |

FOREIGN PATENT DOCUMENTS

| | | |
|---|---|---|
| DE | 102010034054 | 2/2012 |
| DE | 102012005660 | 9/2013 |
| DE | 102012206971 | 10/2013 |
| DE | 102012109088 | 5/2014 |
| DE | 102012223854 | 6/2014 |
| DE | 102012223857 | 6/2014 |
| DE | 102013207841 | 10/2014 |
| DE | 102013221067 | 5/2015 |
| DE | 102014100723 | 7/2015 |
| EP | 1972973 | 9/2008 |
| GB | 2399652 | 9/2004 |
| WO | 9748995 | 12/1997 |
| WO | 0234452 | 5/2002 |
| WO | 2008000208 | 1/2008 |
| WO | 2009115976 | 9/2009 |
| WO | 2014049056 | 4/2014 |
| WO | 2015020205 | 2/2015 |
| WO | 2015022151 | 2/2015 |

OTHER PUBLICATIONS

International Search Report dated Feb. 28, 2017 for corresponding PCT/EP2016/069325.

Deflection of main beam due to inclined exit surface at a distance of 1000 μm, n=1.5

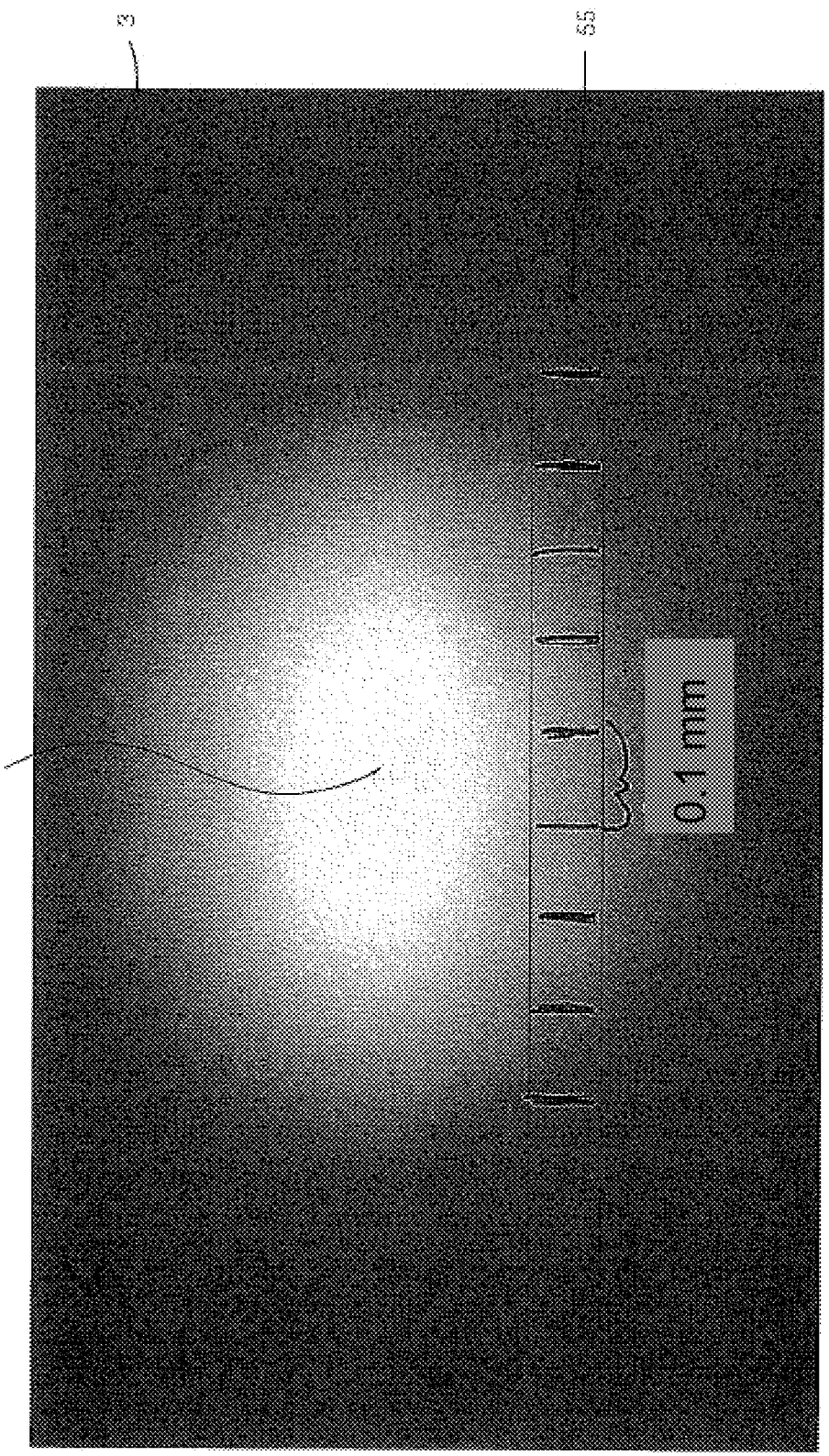

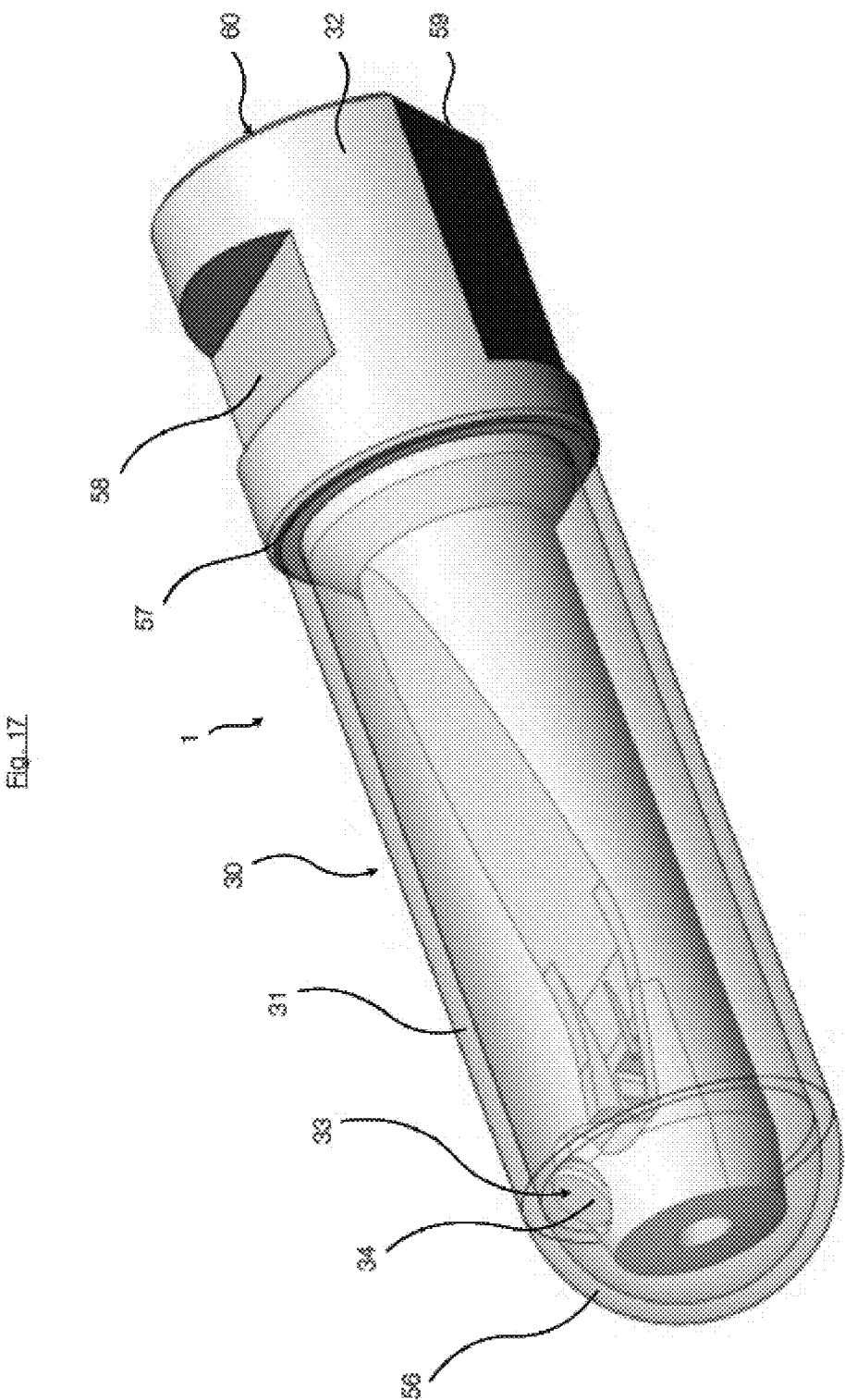

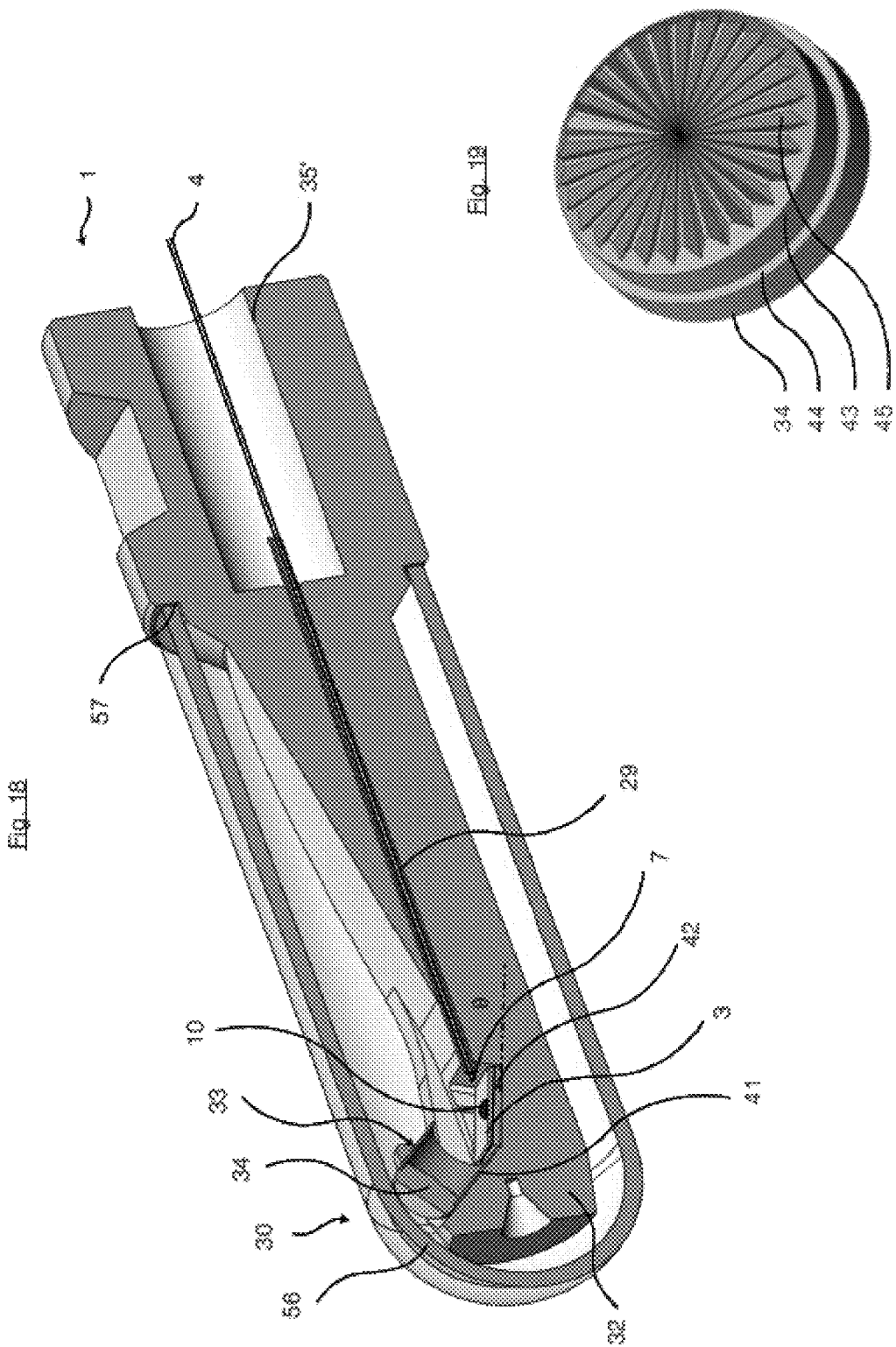

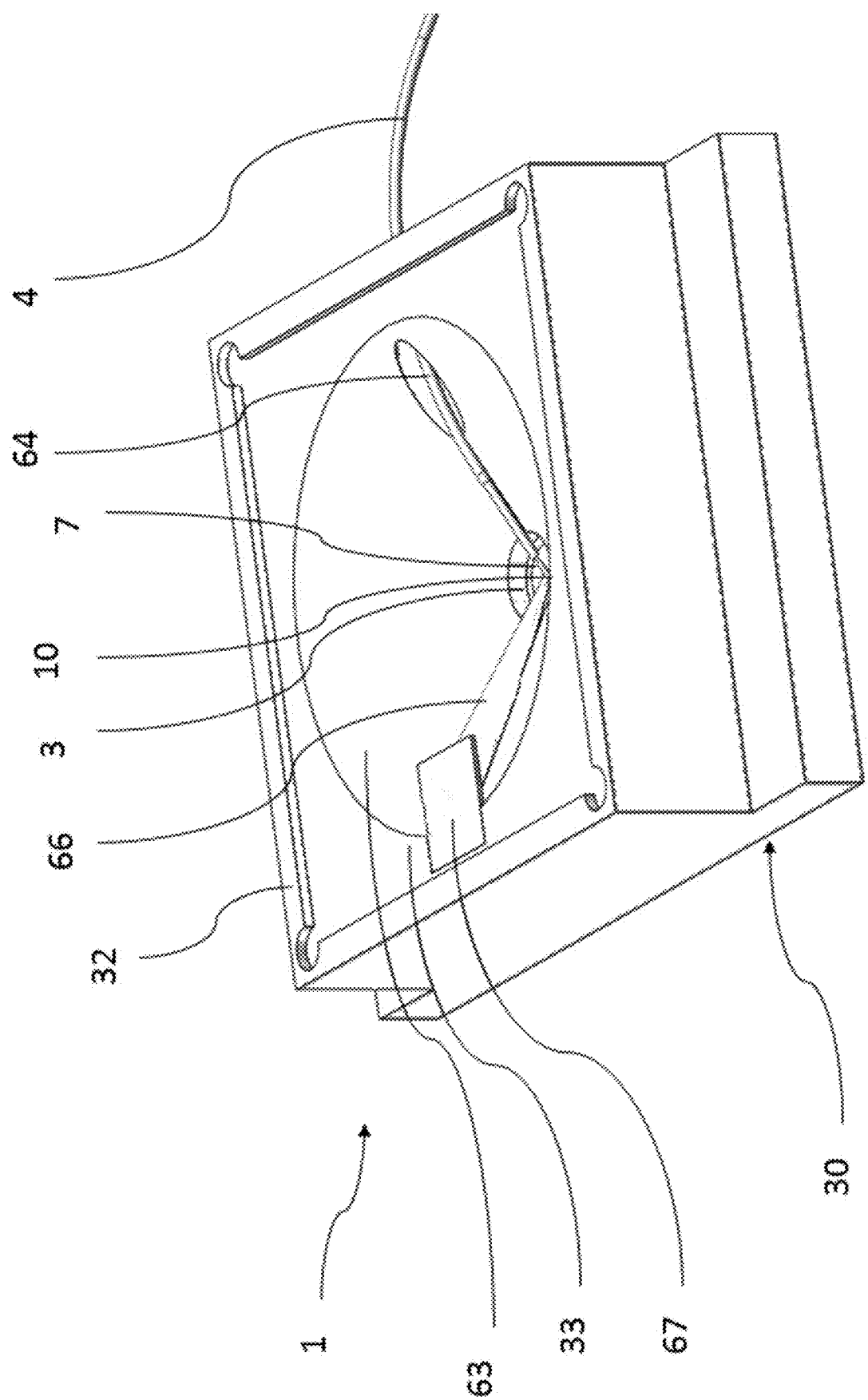

METHOD FOR ALIGNING A LIGHT SPOT PRODUCED ON AN OPTICAL CONVERTER, DEVICE COMPRISING A LIGHT SPOT AND USE THEREOF, AND CONVERTER-COOLING BODY ASSEMBLY WITH METALLIC SOLDER CONNECTION

CROSS REFERENCE TO RELATED APPLICATIONS

This application is a continuation of International Application No. PCT/EP2016/069325 filed on Aug. 15, 2016, which claims benefit under 35 U.S.C. § 119(a) of German Patent Application No. 102015113552.3 filed Aug. 17, 2015, German Patent Application No. 102015113551.5 filed Aug. 17, 2015, and German Patent Application No. 102015113562.0 filed Aug. 17, 2015, the entire contents of all of which are incorporated herein by reference.

BACKGROUND

1. Field of the Invention

The invention relates to a method for aligning a light spot produced on an optical converter and to a device comprising an aligned light spot and use thereof, in particular as a light-emitting device of automobile headlights. The invention also relates to a conversion module comprising an optical converter, as a part of a lighting device. The conversion module is operated with excitation light of a light source using a fiber-optical light guide. Finally, the invention relates to a converter-cooling body assembly and to a method for producing a converter-cooling body assembly. In this aspect, the invention relates in particular to an optical converter that is connected to a cooling body by a metallic connection.

2. Description of Related Art

A light-emitting device as a part of a headlight is known from WO 2008/000208 A1, which corresponds to DE 10 2006 029 2003 A1, and comprises an excitation light source and coupled thereto a light guide and downstream thereof a converter material for converting the shorter wavelength excitation light into useful light of an average longer wavelength having an appearance of white light. The useful light, in this case, is composed of a longer wavelength fraction of converted light and an unconverted fraction of the excitation light. In detail, a plug-in connection to a transparent body, a converter in the transmission mode and an optical component for emitting the converted useful light in a preferred direction are provided. A cooling body for the converter is not provided.

From DE 10 2010 034 054 A1 a laser-based white light source is known, in which a laser produces a light spot in a converter by means of a converging lens, for delivering white useful light in a transmission mode. In order to avoid high temperatures at the light spot, the converter is produced using thermally conductive material and is additionally cooled by air and/or is rotated to cause the light spot to move around in the converter material.

The use of a plurality of light guides adjacent to each other in a light-emitting device that includes a converter in transmission mode is known from US 2010/0254153 A1.

Document US 2015/0062953 A1 describes lighting equipment for generating white light from blue or violet excitation light and converted emitted yellow light. The excitation light can be directed to a converter that is attached to a carrier device. The carrier device serves to position and fix the radiation source relative to the conversion medium.

Document WO 97/48995 A1 describes a fiber optic module which includes a plurality of bundled light conducting rods.

Document WO 2015/020205 A1 describes an LED light source which comprises a phosphor element. The phosphor element is layered and arranged on the side walls surrounding the LED light source.

WO 2014/049056 A2 describes a fiber-optic conversion module which can be operated as a lighting device on a vehicle. In order to transfer the excitation light to the conversion medium or converter, a plurality of optical fibers appear to be provided. Therefore, a distributor housing is provided which serves to bring together a plurality of optical fibers.

US 2008/0075406 A1 discloses an optical component comprising a converter, a light guide leading thereto, a holder of the light guides and a cap for securing the converter to the holder. The cap and the holder are made of a material of high thermal conductivity for preferably dissipating heat from the converter, which is operated in transmission mode.

Light-emitting devices, for headlights, in part also in remission mode, are known from US 2011/0148280 A1, US 2011/0279007 A1, US 2011/0280033 A1, US 2012/0106178 A1, US 2012/0106183 A1 and US 2012/0069593 A1. Here, the converter material is arranged in form of a block in the focus of the parabolic headlight mirror, with a transparent plate extending transversely through the parabolic mirror for mounting the converter (US 2011/0148280 A1, US 2011/0279007 A1, US 2011/0280033 A1, US 2012/0069593 A1), or a support wall is formed along the axis of the parabolic mirror, to which the converter is mounted (US 2012/0106178 A1, US 2012/0106183 A1).

The quality of the exit surface of the fiber is also an important factor for avoiding undesired scattered light in a fiber-optic conversion light source. Various methods are generally known for producing a fiber end having an exit surface for the light guided in the fiber.

Mechanical separation of fibers, by which an exit surface is defined for the light guided in the fiber, is described in EP 1 972 973 A2, for example. It is further possible to produce exit surfaces that are inclined relative to the longitudinal axis of the fiber, i.e. extend at inclination angles other than 90° relative to the fiber axis, by means of a mechanically elaborate device of complex structural dimensions.

WO 02/34452 A1, for example, discloses the producing of a fiber end having an exit surface for the light guided in the fiber, by means of laser radiation. By cutting off fiber material, an exit surface is achieved that extends substantially perpendicular to the longitudinal extension of the fiber.

British patent application GB 2 399 652 A describes the producing of a faceted fiber end having a faceted exit surface, by means of laser radiation.

SUMMARY

Aligning optical assemblies of fiber-optic conversion modules is of increased importance, because the available useful light which is emitted by the headlights supporting this module should not be unnecessarily reduced. Consequently, the conversion light emitted by the fiber should be converted in spectrally and spatially correct manner to the greatest possible extent within the optical converter, and should subsequently usually be emitted within a single useful light cone. For this purpose, in particular the alignment of the conversion light exiting from the fiber on the optical converter is significantly important.

The conversion light exiting from the fiber typically produces a light spot on the optical converter, and the lateral position and direction of incidence thereof have to be aligned within predefined tolerances. Entirely mechanical alignment methods for the fiber achieve accuracies of the lateral position with deviations of 200 µm and more.

An object of the invention is to improve the accuracy of alignment of a light spot in a method for aligning a light spot on an optical converter and in a device comprising an aligned light spot, and in particular to support feasibility of the alignment on an industrial production scale.

According to another aspect, an object of the invention is to provide a fiber-optic conversion module comprising an optical converter of simple configuration, which is suitable as an assembly component between an excitation light source and a headlight in a lighting device for emitting useful light, and which provides for good heat dissipation.

For reasons of cost, the conversion module should be able to be operated with only a single fiber. Shading, in particular by the provided fiber, should be the lowest possible. In addition, simple and rapid assembly of the conversion module on the one hand, and as a unit on the other hand should be possible in the utility device, such as the lighting device, in order to allow for cost-effective manufacturing and assembly. Consequently, the conversion module should also be maintenance-friendly, i.e. easily replaceable in case of damage. Fine alignment should be possible even after finished assembly. Furthermore, the required beam safety when using laser light as the excitation light in lighting devices should also be ensured.

According to yet another aspect, an object of the invention is to provide a converter-cooling body assembly in which a cooling body and a converter are connected such that the connection between the converter and the cooling body preferably exhibits high reflectance and the connection between the converter and the cooling body as well as the entire system exhibits low thermal resistance and has a long life expectancy, and yet cost-effective selection should be possible. Therefore, a further object of the invention is to provide a method for producing such a converter-cooling body assembly.

An advantage of the method is that in particularly preferred embodiments the final product may already be available after the alignment without the need for further manufacturing steps that might influence the alignment, such as fixing of the fiber or the optical converter, for example.

In a particularly preferred embodiment of a method for aligning a light spot of light exiting from at least one light guide on an optical converter, the light guide comprises a light guiding fiber, and the normal of the exit surface of the fiber has an angle $\alpha$ relative to the longitudinal axis of the fiber which is different from 0°, and the position of the light spot on the converter is aligned by adjusting the angle $\alpha$. By adjusting the angle $\alpha$ before or after the fiber is fixed in its holder, a separate degree of freedom is obtained for the alignment, which can preferably influence the horizontal direction of the light that is exiting from the fiber. However, in further preferred embodiments, the angle $\alpha$ may as well be inclined relative to the horizontal, and a freely selectable lateral correction of the position of the light spot can be made for the alignment, in particular if the actual position of the light spot prior to the alignment is known and the nominal position after the alignment is known, for example when using an image processing process control system. In this case, the change in the inclination of the exit surface of the fiber causes the light spot to move from its actual position to the desired nominal position.

Furthermore, with the aligning of the light spot it is not only possible to influence and optimize the position of the light spot on the converter in a lateral direction, but also the position and direction of the remitted useful light that is exiting from the optical converter. As a result, loss of useful light due to shading can be minimized, for example.

In a particularly preferred embodiment, the fiber is first fixed in a holder, and after the fixation in the holder the angle $\alpha$ is adjusted and the position of the light spot is aligned. Particularly advantageously, this position is already the final position of the fiber as it is used in the final fiber-optic conversion module. In this way, substantially all optimizations that are important for the final product can already be made by this alignment, and production reliability is achieved so that no further adverse changes have to be introduced.

In a less preferred embodiment, the exit surface of the fiber is first adjusted to a predefined angle $\alpha$ which essentially corresponds to the aligned angle $\alpha$, and only then the fiber is fixed in the holder. For this purpose, the position of the light spot can be determined prior to its alignment, for example in the form of the correct nominal position according to construction specifications, and can be verified after its alignment on the optical converter, for example with imaging manufacturing devices. Specimens thus produced and exhibiting excessive deviations from the correctly aligned position can then be reworked with the method that has been described above as a particularly preferred embodiment, or these faulty specimens can be discarded from the manufacturing process.

Advantageously, the exit surface of the fiber is processed during the alignment, in particular in a material removing manner, such that the angle $\alpha$ of the exit surface is thereby changed.

Although grinding and polishing of the fiber end surface is in principle also feasible for this material removing processing, the processing using optical means is preferred, for example using laser radiation, because the evaporating fiber material usually entails less contamination of the further assemblies, in particular if sufficient extraction of the removed matter is ensured.

Alternatively, the angle $\alpha$ may as well be modified by applying material, for example by gluing on a prism, which can also be processed if it does not immediately lead to correct alignment.

Both the light guiding core of the fiber and the sheath structures thereof are advantageously processed in the material removing processing, which is feasible with very low contamination of the remaining assemblies of the fiber-optic conversion module when using laser light of appropriate intensity and appropriate wavelength and if sufficient extraction of the removed and at least partially evaporated matter is ensured.

The term sheath structures in this context and in the present description refers both to the outer sheath structures which are also referred to as cladding and which are used for mechanical protection of the light guiding structures, and also the inner sheath structures surrounding the light guiding fiber core in case of step-index waveguides and having a different refraction index than the light guiding fiber core. In case of graded-index fiber systems, no further differentiation is needed for the terms of inner sheath and core at this point, since the entire fiber can advantageously be processed during the material removing processing without dependence of the desired material removal on the light guiding structures. Insofar as beam paths are considered and discussed below, this will be done on the basis of the main ray which in geometrical optical approximation is that ray which propagates inside the respective fiber in the direction of the longitudinal axis thereof and is also incident on the respective exit surface of the fiber from this direction. Also, the type of fiber does not need to be differentiated for describing the geometrical optical circumstances, since, although glass-based fiber types are preferred, the invention can nevertheless be applied to essentially all fibers.

Most preferably, the spacing between the exit surface of the fiber and the optical converter is also adjusted in the material removing processing, the spacing between the fiber and the optical converter indicating the spacing between the exit point of the main ray from the fiber and the optical converter. Since the light that is exiting from the fiber has a defined opening angle which substantially corresponds to the effective numerical aperture which is determined and thus selectable by the injection, by the ability of the fiber to guide light, and by its exit aperture, the adjustment of the spacing also permits to modify and thus align the size of the light spot on the optical converter.

Preferably, the exit surface of the fiber is processed during the alignment, and is in particular processed in a material removing manner using laser light, such that a planar surface is achieved which extends at an aligned angle α.

Alternatively, the exit surface of the fiber can be processed during the alignment, in particular in a material removing manner using laser light, such that a non-planar exit surface is resulting, which is in particular curved.

In the case of a cylindrically convex curvature of the fiber, for example, it is thus possible to provide effects like a cylindrical lens, and to from the light spot with an elliptical-oval or circular shape in terms of its height to width ratio, for example. In case of a spherical or else aspherical curvature of the exit surface, it is furthermore possible to define a focus on the surface or at least in the vicinity of the surface of the optical converter that is able to contribute to an improved conversion rate of the converter.

For this purpose, the exit surface of the fiber can be preferably processed during the alignment in a material removing manner, in particular using laser light, such that a planar surface is achieved at first which extends at an adjusted angle α in accordance with a correct alignment, and then a non-planar shape, in particular a curvature, can be produced in the exit surface of the fiber by further material removing processing, in particular using laser light, whereby the fraction of the useful light that is exiting from the converter can be increased.

The processing sequence described above may as well be performed while measuring the light that is exiting from the converter, for example by imaging manufacturing methods, and the shape of the exit surface can be optimized thereby. Once the shape of the exit surface has been optimized, this shape may then be transferred to further assemblies to be produced as well, for example.

In this way it is possible to achieve non-planar exit surfaces, e.g. cylindrical, spherical, aspherical exit surfaces, and also exit surfaces of free shapes, in particular also by successive optimizing.

The shape of the exit surface can thus be achieved according to a predefined processing geometry, or can else be optimized using feedback by measuring the actual fraction of useful light.

In particular in case of multi-step successive processing, a significantly optimized fraction of useful light is achieved, in particular also by considering the optical and geometrical properties of the actually used converter and the actually used fiber, since the alignment is made not only with respect to the position of the light spot but also with respect to an overall improved useful light fraction and since in particular all properties of the optical converter can be taken into account.

Advantageously, both the fiber in its holder and the optical converter are arranged in a monolithic body before and after the alignment, and this arrangement already defines the final or finished position of these components.

In this case, the monolithic body is preferably produced by a powder metallurgical injection molding process, in particular by a metal injection molding (MIM) process, which allows to produce bodies with good thermal conductivity and complex geometries in a precise manner.

Also preferably, the thermal conductivity) of the monolithic body together with a cooling body is greater than 200 W/(m*K), and preferably greater than 350 W/(m*K).

Advantageously, the diameter on the optical converter has a size ranging from 0.5 µm to 800 µm, preferably from 1 to 500 µm, and most preferably from 5 µm to 300 µm. In case of ellipsoidal spot shapes, the sizes specified above for the diameter apply to twice the main axes thereof.

In the most preferred embodiment, the lateral deviation of the position of the light spot on the optical converter, in particular after the alignment, is less than 200 µm, preferably less than 150 and most preferably less than 100 µm. Therefore, if the fiber-optic conversion module is integrated into further assemblies or is mounted thereto, further alignments during the insertion and mounting of the conversion module to the further assemblies can usually be avoided if fitting means are provided on the monolithic body that are able to appropriately cooperate with associated fitting means of the further assemblies. In this case, the deviation of the spacing between the exit surface of the fiber and the surface of the optical converter after the alignment can advantageously even be less than 500 µm, preferably less than 250 µm, and more preferably less than 100 µm.

Preferably, the spacing between the exit surface of the fiber and the surface of the optical converter, at which the light exiting from the fiber has an intensity maximum, is between 200 µm and 2500 µm, preferably between 400 µm and 1500 µm, more preferably between 1500 and 800 µm, and most preferably between 600 µm and 1200 µm.

After having been aligned, the angle α can be about 10° to 30°, preferably about 15° to 25°, more preferably about 18° to 22°.

Advantageously, the diameter of the light guiding core of the fiber is about 3 µm to 1500 µm, preferably about 3.5 µm to 1000 µm, and most preferably about 50 µm to 150 µm.

The advantages described above also apply to a device comprising a light guide, from which light exits and is incident on an optical converter to at least a substantially fraction, thereby forming a light spot thereon, and in which the normal of the exit surface of the fiber has an angle α relative to the longitudinal axis of the fiber which is different from 0°, wherein the position of the light spot on the converter is preferably also aligned by the adjustment of the angle α.

Furthermore, this device may comprise a light trap for reflected light exiting from the fiber, which reliably ensures that no reflected excitation light, e.g. laser light, can exit from a damaged fiber-optic conversion module, even in the case of heavy mechanical loads such as loads encountered in case of an accident, for example. This can be ensured even in the case of demolition of the optical converter, if the monolithic body is dimensioned appropriately so as to be able to reliably absorb the forces arising in such a case.

A further preferred device comprises more than one light guide, from each of which light exits and is incident on an optical converter to at least a substantial fraction, thereby forming a light spot thereon, and in which the normal of the exit surface of the fiber has an angle α relative to the longitudinal axis of the fiber which is different from 0° in each case, and the position of the light spot on the converter is preferably also aligned by adjusting the angle α, in particular according to any one of the methods described herein, and in which the respective light spots superimpose on the optical converter at least to a substantial fraction. In this case, a superimposition of more than 50% of the area of the light spots is regarded as a substantial fraction, within which the intensity of the light of the respective light spots is in each case higher than 50% of the maximum intensity of the light that is emitted by the respective light guide and is incident on the optical converter.

The device described above is in particular also suitable for headlights, such as aircraft headlights, headlights of water vehicles or land-borne vehicles. Spotlights for theater and stage and searchlights for rescue teams, outdoor or offshore applications and the like will benefit as well from the use of this device, because due to the correct position of the emission center of the fiber-optic conversion module associated with the correctly aligned position of the light spot, such headlights are able to guide the useful light supplied by the fiber-optical converter in a very defined manner, and thus provide very defined light distributions, such as it is advantageous for glare-free motor vehicle headlights, for example.

In particular in case of spotlights used in theater, shooting, and on stage, it is possible to produce very sharply defined light figures with high contrast, since an extremely small but intense light source with high precision can be provided at the site predefined by the optical design.

In case of projection devices, in particular digital imaging projection devices, it is possible to produce images with very high contrast, since a very small but nevertheless intense light source is provided which supports the optical correction of the imaging systems with increased precision.

According to a further aspect of the invention, the object to provide a fiber-optic conversion module of simple construction which is suitable as an assembly component in a lighting device between an excitation light source and a headlight for emitting useful light and which allows for good heat dissipation is achieved by a fiber-optic conversion module as part of a lighting device that emits useful light mixed from shorter wavelength excitation light and longer wavelength conversion light. The conversion module comprises in this case: a support element; a light exit head; and a fiber-optical light guide; wherein the light exit head is configured for positioning and holding a light exit end of the light guide; a light entry end of the fiber-optical light guide is configured for being coupled to an associated excitation light source; the light exit end of the light guide is configured to emit excitation light in a predetermined beam direction; and wherein the support element is configured to hold a converter; the support element comprises means for being connected to the light exit head such that the converter is located in the beam direction of the excitation light exiting from the light exit end of the light guide, and is arranged inclined to the beam direction of the excitation light; wherein a predetermined spacing is given between the center of the converter and the light exit end of the light guide; and wherein the converter serves to convert the shorter wavelength excitation light into the longer wavelength conversion light and to emit the mixed useful light.

The light guide or the fiber-optical light guide may have a light entry end equipped with a plug for being coupled to an associated excitation light source. The light exit head ensures that the light exit end of the light guide directs the shorter wavelength excitation light onto the light spot on the surface of the converter. The light exit head comprises a receptacle for holding and fixing the light exit end of the light guiding fiber and is furthermore configured to be firmly connected to the support element.

The major portion of the shorter wavelength excitation light penetrates into the converter and is converted there into longer wavelength conversion light which is emitted along with scattered excitation light as useful light in a usable radiation angle, while unwanted reflected excitation light (the so-called Fresnel reflection) can be collected by a light shield to be rendered harmless. In the case of a car headlight, the useful light is emitted to a parabolic mirror.

Starting from the converter, the useful light propagates from the converter in a region of a usable radiation angle. In this case, the useful light is emitted from the light spot in a conical shape. The resulting opening angle of the light cone is at least 50°, preferably at least 60°, and most preferably at least 70°.

Furthermore, a support element is provided for holding the converter. In a preferred embodiment, the support element comprising the converter is structurally separated from the light exit head. For assembling the conversion module, the support element and/or the light exit head are configured such that they can be firmly connected to each other. For this purpose, the support element and/or the light exit head may include suitable features for a firm connection, such as a recess and an accurately fitting complementary seat, in order to achieve a firm and highly precise connection. The exact positioning may be promoted by providing further alignment aids, such as a limit stop or positioning pins. The exact alignment of the light exit head and the support element in the assembled position is of great importance in order to emit the excitation light precisely onto the converter.

For example, in a preferred embodiment the light exit head may be in the form of a rotationally symmetrical cone and can be inserted into an accurately fitting complementary bore of the support. Preferably, a narrow tolerance of the fit is chosen, which permits to join the light exit head with low pressure.

The separation into a support element which comprises and supports the converter, and a light exit head which is configured to hold and fix the light guiding fiber offers several advantages, in particular when compared to solutions where the holder of the light guiding fiber and the converter are provided on a common support element.

Thus, the light exit heads can be produced comparatively easily and inexpensively in large quantities here, and are subsequently connected to the support element. The support element and/or the light exit head can therefore already be a part of a lighting device or can be configured as a part of a lighting device.

Furthermore, the light exit head comprising the optical fiber or the light guide can easily be removed and replaced, for example because of a breakage of the optical fiber after assembly in the lighting device, or after prolonged operation, or because of other failures in the area of the light guiding fiber. Such defects can occur, for example, when the conversion module is used in a car headlight which is often subjected to vibrational loads. Thus, the structural separation not only facilitates and simplifies manufacturing and assembly, but also maintenance and replacement of components.

Due to the structural separation, it is further possible to use different materials for the support element than for the light exit head. This can be advantageous, since the converter generates a large amount of heat while in operation, and the generated heat might damage the light guiding fiber.

For this purpose, the support element can advantageously be produced from a heat-resistant sintered material, such as a metallic sintered material. Such a material usually behaves uncritically under high temperature loads that may arise during the operation of the converter. In addition, the resulting thermal expansion of the support material will be rather low, so that a temperature-induced change in the light characteristics caused by a changed spacing between the light guide and the converter due to thermal expansion can largely be avoided.

The support element may also be configured as a heat sink in the region that is intended as a seat for the converter, i.e. assume a heat-dissipating function. The support element may as well comprise a cooling body for supporting the converter with a heat-conducting and mechanically firm connection. Thus, the support element is configured so that heat generated in the converter can be removed and dissipated via the support element. Due to the structural separation it is possible to reduce the heat transfer to the light exit head and/or to the light guiding fiber, so that the risk of damaging the light guiding fiber during operation is reduced.

In addition, the problem of bundling the light exiting from a plurality of light exit ends in confined spaces and to focus it on a common light spot on the converter surface is eliminated. Usually, the various light guiding fibers have to be provided with a bevel cut at their light exit ends for this purpose, which may moreover depend on the specific arrangement of each individual optical fiber, which makes manufacturing rather complicated and expensive.

Different measures can be taken for routing and holding the light guiding fiber in the light exit head. Preferably, a bore is provided the light exit head, through which the light guiding fiber may extend. Expediently, the light exit head comprises an insert part, preferably a sleeve, in which the light exit end of the light guiding fiber can be fixed and retained. The inner diameter of the sleeve is dimensioned so as to be complementary to the outer diameter of the light guiding fiber for an accurate fit, preferably also with very narrow tolerance, in order to provide for a precise positioning of the light guiding fiber. The inner diameter of the insert element is matched to the outer diameter of the light guide and may range from 0.1 mm to 0.5 mm, with a maximum deviation of not more than +/−0.1 mm, preferably not more than +/−0.05 mm, and most preferably not more than +/−0.02 mm. The inner diameter of the insert element for a light guide that has an outer diameter of 0.34 mm is preferably 0.35 mm.

As a result, the required very narrow tolerances in positioning the light exit end can be met. In addition, the insert element should have a minimum length in order to allow for an appropriate routing of the light exit end in parallel to the axis an without bends, so that the excitation light will exactly exit in beam direction. Furthermore, the light exit end is preferably provided with a planar polished surface perpendicular to the longitudinal axis in order to emit the excitation light in beam direction.

In this way it is possible to achieve a very good radial alignment and positioning of the light guiding fiber with respect to the converter when the light exit head is connected to the support element.

In a particularly preferred embodiment, means are furthermore provided for enabling subsequent axial alignment of the light exit end of the light guiding fiber with respect to the converter. Starting from a predefined spacing between light exit end and converter, which is typically in a range of about 1 to 10 mm, this spacing can then be changed within a particular range, preferably in a range from 0.05 mm to 5 mm. Thus, it is possible to exactly axially position the light guiding fiber with respect to the converter. This can be advantageous if, for example, the light guide must be replaced and another light guide is used with slightly different optical properties, which requires correspondingly changed positioning with respect to the converter in order to obtain the same useful light.

For example, the insert element can be firmly connected to the light exit end, such as by clamping or gluing, and can then be inserted into the light exit head. After assembly, it can be moved in the axial direction before being fixed by gluing, for example. In another embodiment, the end of the light guiding fiber can be moved axially in the insert element.

In another preferred embodiment, the light exit head is already configured to comprise a reflector or as part of a reflector. In this embodiment, it comprises a feed for the light guide and an opening in which the converter of the support element is arranged. Excitation light exiting from the light guide can then be incident on the converter, after assembly.

According to yet another aspect of the invention, the object of providing a converter-cooling body assembly is achieved by a method for producing a converter-cooling body assembly that comprises an optical converter for at least partially converting light of a first wavelength into light of a second wavelength, and a cooling body, wherein preferably at least parts of the surface of the optical converter are directly coated with a metal-containing coating, wherein the metal-containing coating is capable of dissipating the heat from the converter into the cooling body, the cooling body is connected to the optical converter, in particular to the metal-containing coating, through a metallic solder connection and wherein the cooling body and/or the optical converter is connected to a further assembly through a further solder connection.

Thus, the converter-cooling body assembly becomes a selectable unit, since further assemblies will be connected to this unit only after the second solder connection has been produced, and moreover, an extremely advantageous structure is achieved once the second solder connection has been produced.

Excellent thermal conductivity is provided by using two metallic connections, the first and the second solder connection, because the metallic solder connection exhibits low thermal resistance, at least in comparison to the ceramic material of the optical converter.

Furthermore, a further alignment can be made even after the two solder connections have been produced, due to the different melting temperatures $T_{m1}$ and $T_{m2}$, which can advantageously influence the reflection angle, for example. For this purpose, the assembly comprising the converter-cooling body assembly can be heated to a temperature that is greater than $T_{m2}$ but lower than $T_{m1}$, whereby the converter-cooling body assembly is now repositionable, and can be mechanically fixed in the newly positioned and thus improved aligned position by cooling at least the second solder connection below $T_{m2}$.

In this case, the second solder connection advantageously comprises a solder that has a lower melting point $Tm2$ than the melting point $Tm1$ of the solder of the first solder connection.

In a particularly preferred embodiment, the first solder connection is produced at first, preferably at a temperature greater than or equal to $Tm1$, and then the second solder connection is produced. In this case, the second solder connection can be produced directly after the first solder connection, even during the cooling process, if a temporally defined "cooling ramp" is run and the assemblies are appropriately "prepositioned" in a "pre-alignment" state.

Subsequent alignments are still possible. For example if not all assemblies are correctly aligned after producing the two solder connections, a further heating can be performed, as far as necessary, to a temperature greater than $Tm2$, which should remain at a temperature lower than $Tm1$ at least for a long time, so that the first solder connection will not be released anymore but the second one softens, thus allowing for the respectively necessary or advantageous realignment.

It is generally advantageous if the second solder connection is produced at a temperature greater than $Tm2$ and not permanently exceeding $Tm1$, so that the first solder connection is not weakened to such an extent to significantly change the arrangement of the optical converter relative to the cooling body, at least during the producing of the second solder connection.

Here, the wording "significantly changed" refers to a relative change in position of the optical converter relative to the cooling body, which can be measured and exceeds the relative change in position as caused by thermal expansion.

A particularly stress-free converter-cooling body assembly is achieved if the heating of the arrangement comprising at least one optical converter and at least one cooling body for producing the respective solder connection is accomplished by placing it in a furnace at a temperature greater than $Tm1$ or $Tm2$, and the minimum retention time of the arrangement of at least one optical converter and at least one cooling body in the furnace allows to achieve a temperature equilibrium state.

At this temperature equilibrium, the respective temperatures of the optical converter, the cooling body, the solders and the further assemblies should not differ by more than 5 K in each case. Because the arrangement is particularly free of thermal stresses, favorable behavior is achieved even under thermal load.

Preferably, heating of the arrangement comprising at least one optical converter and at least one cooling body for producing the respective solder connection may be accomplished by local heating, in particular through a mechanical thermal contact, e.g. through contact with a preferably thermally controlled heating element, thus through contact with a heated body, e.g. a heated monolithic body of a fiber-optical light exit head, which already carries prepositioned assemblies and is itself inductively heated, for example.

As a result, a rapid and accurately dosed heat input is feasible, which can be particularly advantageous for manufacturing in terms of time and very precise in thermal terms.

Alternatively or additionally, heating of the arrangement comprising at least one optical converter and at least one cooling body for producing the respective solder connection may be accomplished by local heating, in particular using radiation, focused thermal radiation, laser radiation, in particular also pulsed laser radiation.

If the heating of the arrangement comprising at least one optical converter and at least one cooling body and preferably a further optical assembly for producing the respective solder connection is accomplished at reduced ambient pressure and in particular if reduced ambient pressure prevails until the respective solder connection is produced, a particularly cavity-free and homogeneous solder connection is achieved, in which even irregularities of the surface of the optical converter, the cooling body and the further assembly are better wetted and can thus be connected by the solder connection more completely.

In this context, the statement that the "solder connection is produced" means that the respective melting temperature $Tm1$ and/or $Tm2$ has been undershot until the respective solder has solidified, i.e. has a strength of more than 50% of the tensile strength of this solder at room temperature in each case, wherein room temperature is assumed to be about 300 K.

The removing of remaining air fractions or cavities in the molten solder allows a more precise manufacturing, in particular of prepositioned assemblies, which is associated with lower losses due to rejects of assemblies that are not within the tolerance range after having been manufactured.

Advantageously, the melting point $Tm1$ is between 250° C. and 450° C., preferably between 280° C. and 320° C., and more preferably at about 300° C.

Likewise advantageously, the melting point $Tm2$ is between 150° C. and 245° C., preferably between 180° C. and 230° C., and more preferably at about 220° C.

With this selection of the melting points $Tm1$ and $Tm2$ it is possible to implement reliable and fast manufacturing procedures, lower temperature differences of the melting points allowing for faster production processes due to faster heating and cooling, and greater temperature differences being associated with higher production reliability.

If a multitude of optical converters is mounted on at least one cooling body and preferably heated together, serial production can be advantageously supported hereby, since the respective solder connection can already be produced for this multitude of optical converters in that case. Advantageously, the optical converter can be substantially correctly positioned by holders each one mounted to the cooling body, and in many cases it can also be accommodated in correct alignment with respect to further assemblies.

Once the first solder connection has been produced, for example, at least a portion of the at least one cooling body which supports at least one optical converter and forms a converter-cooling body assembly therewith can be separated and supplied to further manufacturing. Advantageously, the separating in the cooling body can be effected along a predefined and mechanically weakened line.

In a particularly preferred embodiment, a converter-cooling body assembly, in particular as described above and below in more detail, is mounted to a light exit head of a fiber optic conversion module.

If in industrial scale manufacturing at least a fraction of a multitude of optical converters along with further assemblies are brought to a temperature lower than $Tm1$ but greater than $Tm2$, and preferably the position of the assembly of optical converter and cooling body is checked with respect to further assemblies, in particular with respect to assemblies of a light exit head of a fiber-optic conversion module, binning, i.e. a selection can already be made during manufacturing based thereon, and additionally further mechanical alignments can be made. One of these alignments can be an adjustment of the spacing between the optical converter and fibers from which excitation light is exiting, for example. This also permits to adjust the size of light spots of the excitation light on the optical converter, based on the beam lobe which is formed by the excitation light after exiting from the fiber.

Advantageously, the invention also provides a converter-cooling body assembly which comprises an optical converter for at least partially converting light of a first wavelength into light of a second wavelength, preferably a metal-containing reflective coating, and a cooling body, wherein, preferably, at least sections of the surface of the optical converter are directly coated with the metal-containing coating, the metal-containing coating is capable of dissipating heat from the converter in the cooling body, the cooling body is connected to the optical converter, in particular to the metal-containing coating through a metallic solder connection, and the cooling body and/or the optical converter is connected to a further assembly through a further solder connection.

In this converter-cooling body assembly, the second solder connection may comprise a solder that has a lower melting point Tm2 than the melting point Tm1 of the solder of the first solder connection, in particular in order to achieve the advantages described above.

Advantageously, the first solder is an Ag/Au solder and thus can preferably provide an alloy comprising silver and gold.

Advantageously, the second solder is an Ag/Sn and thus can preferably provide an alloy comprising silver and tin.

Preferably, the cooling body comprises alloys of steel, aluminum, copper and/or bronze, which are readily wettable by appropriate solders, if necessary with the addition of soldering fluxes and cleaning agents, and are connectable by solder connections.

BRIEF DESCRIPTION OF THE DRAWINGS

The invention will be described in more detail below by way of preferred embodiments and with reference to the accompanying drawings, wherein:

FIG. 16 shows a typical brightness distribution of a light spot on the optical converter as it is produced in the embodiments shown above and below by the light which is exiting from the fiber and is incident on the optical converter, together with a length scale;

FIG. 17 is a perspective view, obliquely from above, illustrating the light exit head of a fiber-optic conversion module of a third embodiment;

FIG. 18 is a horizontal perspective sectional view of the fiber-optical light exit head of FIG. 17, cut through the center of the light exit head and through the center of the fiber of the fiber-optic conversion module;

FIG. 19 is a perspective view of an element of a light trap of the fiber-optical light exit head illustrated in FIG. 17 and FIG. 18;

FIG. 20 is a perspective view, obliquely from above, of the fiber-optical light exit head of a fiber-optic conversion module of a fourth embodiment;

DETAILED DESCRIPTION

Figure 1:
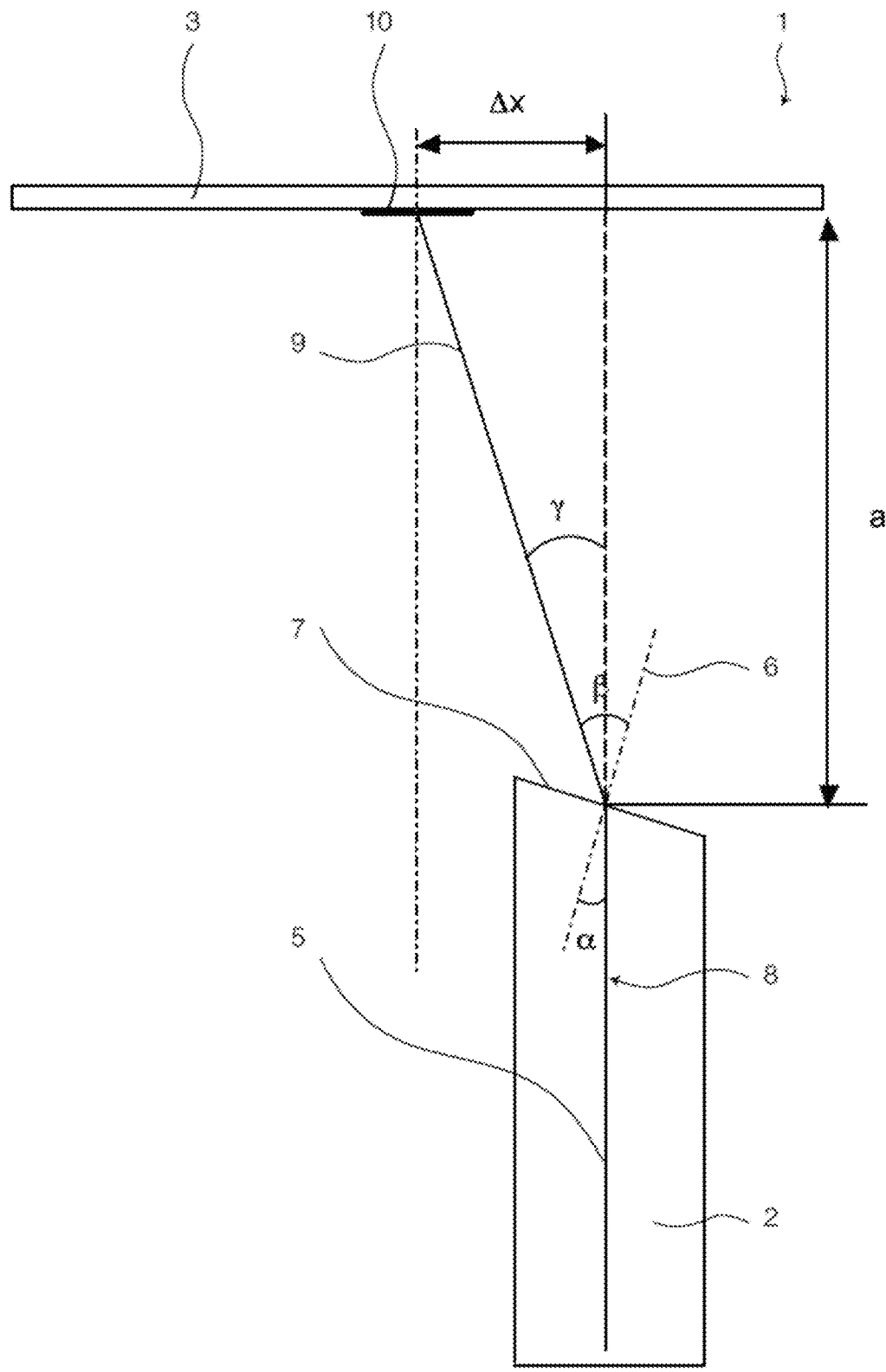
FIG. 1 is a schematic diagram of assemblies of a fiber-optic conversion module in which light exits from at least one optical fiber and is incident on an optical converter, wherein the normal of the exit surface of the fiber has an angle α relative to the longitudinal axis of the fiber which is different from 0°, and wherein the position of the light spot on the converter can be aligned by adjusting the angle α.

In the following detailed description of preferred embodiments, the same or equivalent assemblies are indicated by respective identical reference numerals. Insofar as there are any significant functional differences, these will be explained in more detail in each case with reference to the embodiment and assembly concerned.

First, reference is made to FIG. 1 which shows a schematic diagram of assemblies of a fiber-optic conversion module 1, in which light is exiting from at least one light guide 2 and is incident on an optical converter 3.

Light guide 2 that is configured as an fiber-optical waveguide 4, which will only be is referred to as fiber 4 below, for short, guides excitation light 5 from a light source (not shown in the figures), for example a laser light source, preferably a laser diode, which is in the blue or near ultraviolet wavelength range of the optical spectrum.

In optical converter 3, this light causes excitation of the phosphors embedded therein, which emit useful light of a longer wavelength, typically in the yellow wavelength range of the optical spectrum, which is superimposed by a fraction of the excitation light due to scattering in the optical converter. Due to the fraction of the scattered excitation light together with the light emitted by the phosphors of the optical converter, a white color impression of the useful light can be created, which can be adjusted in a defined manner by the selection of the phosphors and the adjustment of the scattering behavior of the optical converter.

In case of the conversion module illustrated in FIG. 1, the normal 6 of exit surface 7 of fiber 4 has an angle α relative to the longitudinal axis 8 of fiber 4 which is different from 0°. In this case, the excitation light 5 propagates in fiber 4 substantially in the direction of the longitudinal axis 8 thereof, and when exiting from fiber 4 defines a beam lobe corresponding to the effective numerical aperture, which is clearly visible in FIG. 21 and FIG. 22, for example, but which is illustrated in FIG. 1 only by the main ray 9 thereof, which extends in fiber 4 substantially in parallel to the longitudinal axis 8 and is refracted at exit surface 7 of fiber 4 when exiting, whereby this ray then propagates further at an angle γ relative to the longitudinal axis 8 of fiber 4.

By adjusting the angle α, as will be explained in more detail below, it is possible to align the position of light spot 10 on the optical converter 3, light spot 10 being schematically indicated in FIG. 1 as extending around main ray 7.

In the following explanations, Δx denotes the excursion which is resulting from the refraction of the main ray at the inclined exit surface 7. This excursion Δx is illustrated with respect to a prolongation of longitudinal axis 8 of fiber 4 which corresponds to the excursion relative to a main ray not changed in its propagation direction at exit surface 7.

The main ray 7 exiting from fiber 2 undergoes a change in its propagation direction that is caused by refraction as mentioned above, corresponding to Snell's law of refraction. The change in the propagation direction, which is also referred to as a deflection below, leads to the excursion Δx and can be calculated as follows:

$$\sin\alpha / \sin\beta = n_{air} / n_{fibercore}$$

wherein:

α is the inclination angle of the normal 6 of exit surface 7 of fiber 4 relative to the longitudinal axis of fiber 4;

β is the inclination of the propagation direction of refracted main ray 9 after exiting from fiber 4 relative to the normal 6 of exit surface 7;

$n_{air}$ is the refractive index of air;

$n_{fibercore}$ is the refractive index of the fiber core of fiber 4.

Furthermore, it can be seen from FIG. 1 that the inclination γ of the propagation direction of main ray 9 with respect to longitudinal axis 8 of fiber 4 after its exit from fiber 4 is:

$$\gamma = \beta - \alpha$$

Thus, with the known geometric distance a of the exit point of main ray 9 from fiber 4 to the optical converter 3, the excursion Δx can be calculated as follows:

$$\Delta x = a * \tan\gamma$$

This distance a is the geometric distance and is distinguished from the optical effective spacing, which indicates the spacing between the exit point of main ray 9 from fiber 4 and the optical converter 3. Unless otherwise stated, the optical effective spacing is referred to as spacing, for short, since this optically effective spacing substantially corresponds to the path of the light exiting from fiber 4 to optical converter 3 and consequently also defines the size of light spot 10 on optical converter 3, by the length of the resulting beam lobe.

Figure 3:
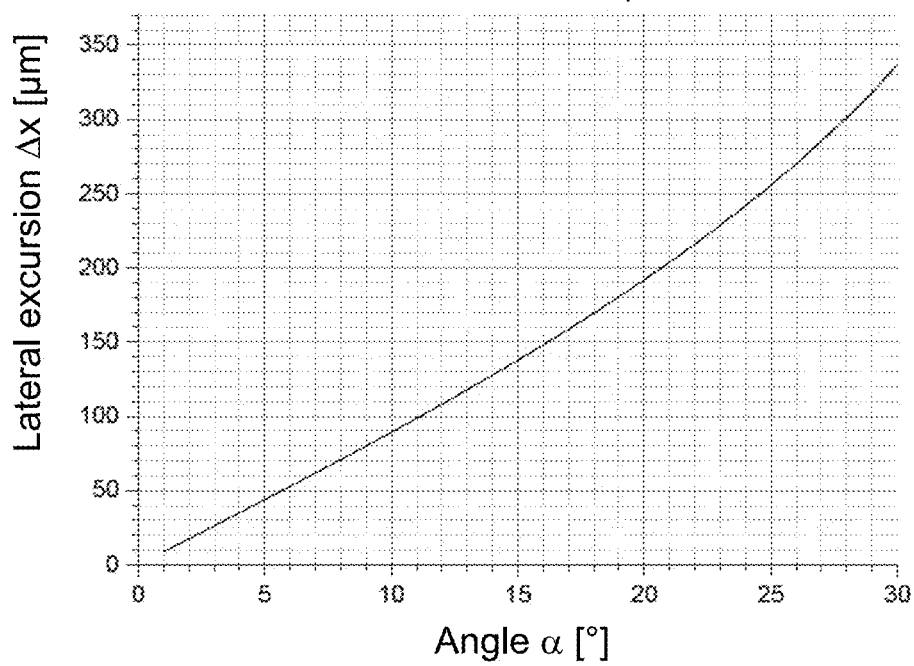
FIG. 3 shows the excursion caused by the deflection of the main or central ray of light exiting from the fiber for an exit surface of the fiber extending at an angle α, as a function of the angle α.

FIG. 3 illustrates Δx as a function of the inclination angle α of exit surface 7 for a fiber 4 having a light guiding fiber core with a refractive index of n=1.5.

With a fiber core having a refractive index of 1.5 and a geometric distance a of 1000 μm, lateral excursions Δx of about 10 μm to 340 μm can be achieved for inclination angles α ranging from 1° to 30°. In this case, air was assumed to be the medium surrounding the fiber-optic conversion module.

Now, reference will be made to FIG. 2 which shows a schematic diagram of light rays that are incident on an optical converter 3 at different angles, together with shading limits of the optical beam path for useful light 11 exiting from converter 3.

Figure 2:
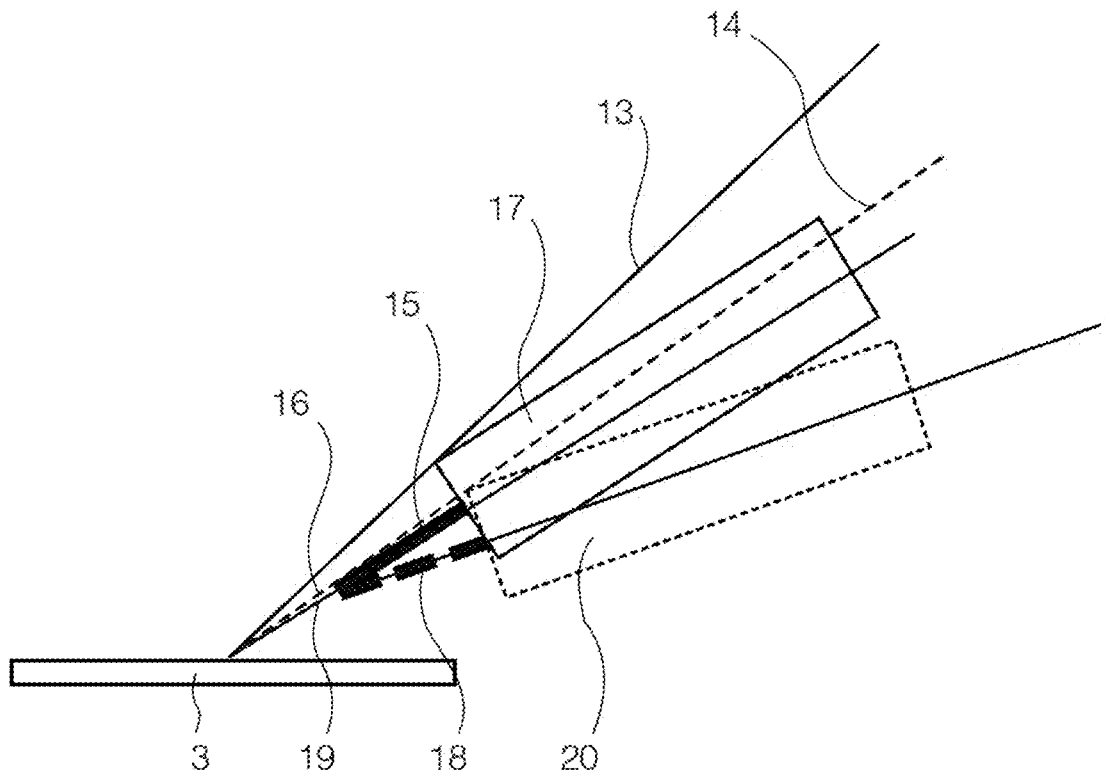
FIG. 2 is a schematic diagram of light rays that are incident on an optical converter at different angles, and of shading boundaries of the optical beam path for useful light exiting from the converter.

Useful light 11 exits from optical converter 3 within an opening cone 12, of which marginal rays 13 and 14 are illustrated in FIG. 2 for two different fiber arrangements.

The light guiding optical fiber 15 has an exit surface with a surface normal that is not inclined relative to the longitudinal axis of light guiding optical fiber 15, so that the main ray 16 of the light exiting from this fiber 15 continues to propagates in the direction of the longitudinal axis of this fiber 15 without deflection. FIG. 2 shows the maximum opening angle of opening cone 12 with its marginal ray 13, up to which the useful light cone 12 will not yet be shaded due to the holder 17 of fiber 15.

However, if the exit surface of the fiber is inclined and the main ray exiting from the fiber is refracted, as shown for marginal ray 14, the holder of a fiber can be inclined away from the useful light cone to a greater extent and the useful light cone can have a larger opening angle without causing shading.

This situation is illustrated for fiber 18 which has an inclined exit surface at which the main ray 19 exiting from this fiber 18 is refracted and is thus deflected as described above with reference to FIG. 1. Due to this deflection, the fiber 18 and the holder 20 can be tilted away from opening cone 12 of useful light 11 to a greater extent, and the useful light cone can have a larger opening angle without shading, compared to a fiber 15 that does not have an inclined exit surface.

In this way, a higher fraction of useful light can be achieved and shading losses can be minimized or at least reduced.

Figure 4:
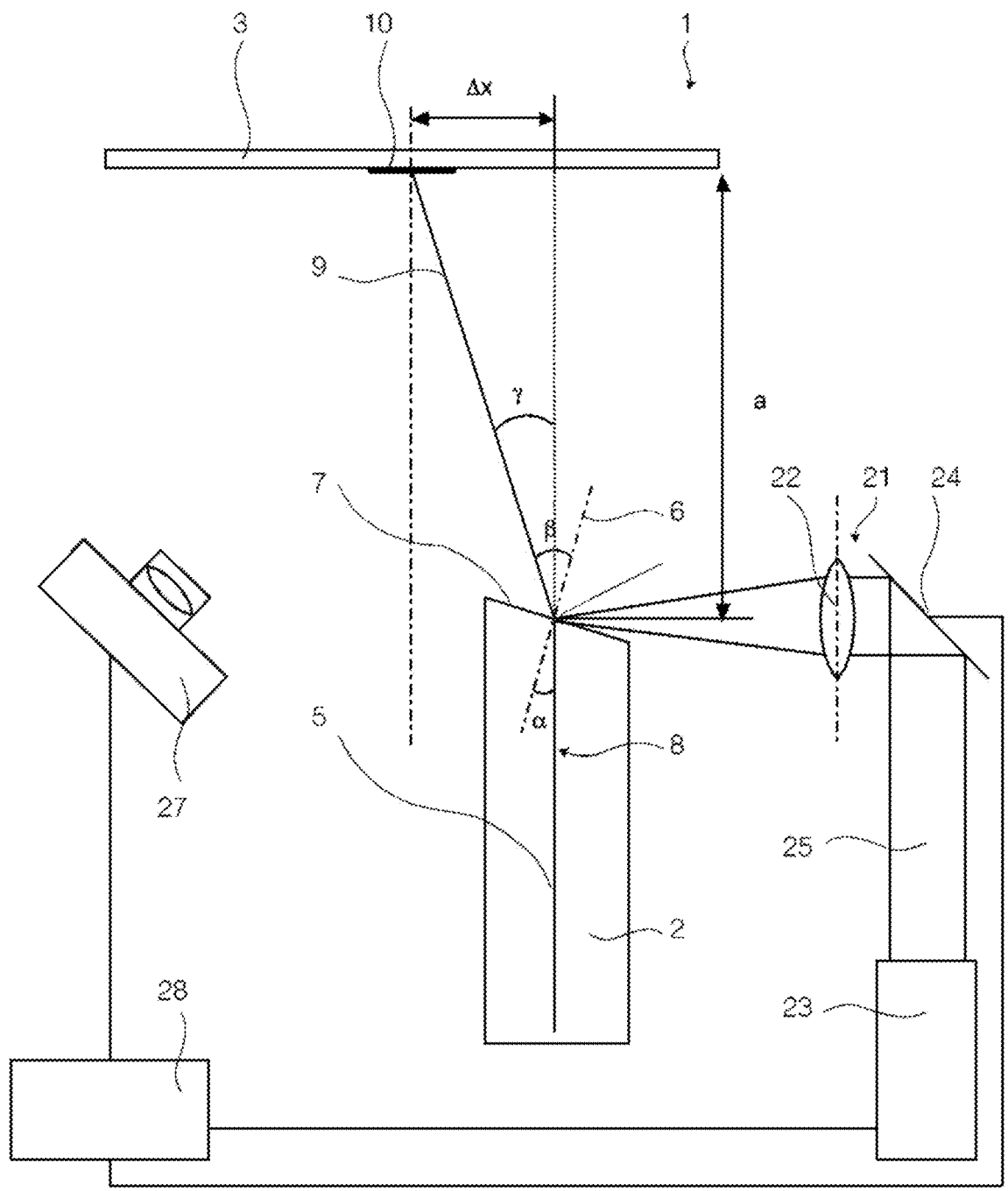
FIG. 4 shows the schematic diagram of assemblies of a fiber-optic conversion module of FIG. 1, illustrating devices for processing the exit surface of the fiber, in addition to the assemblies shown in FIG. 1.

Now, reference will be made to FIG. 4, which illustrates assemblies of a fiber-optic conversion module 1 as shown in the schematic diagram of FIG. 1, and in addition to the assemblies shown in FIG. 1 illustrates devices for processing exit surface 7 of fiber 4, which will be described below in more detail.

Using an optical system 21 which is schematically illustrated as comprising a biconvex lens 22, a $CO_2$ laser 23, and a galvanometer scanner 24 with the beam paths thereof, the light 25 of a laser, preferably a $CO_2$ laser, is directed onto the exit surface 7 of fiber 4.

In this way, the fiber material of fiber 4 can be processed in a material removing manner such that an inclined exit surface 7 is defined, which has a surface normal 6 extending at an angle $\alpha$ relative to the longitudinal axis 8 of fiber 4. Due to the movement of galvanometer scanner 24, the focus 26 of laser light 25 can be directed in a defined manner onto the position at which material is intended to be removed.

By means of a digital image capturing device 27, the position of light spot 10 on optical converter 3 can be detected and transferred to a process control device 28 connected downstream thereof, which can be used to control both, the $CO_2$ laser 23 and the galvanometer scanner 24.

In this way it is ensured that the material removing processing of fiber 4 results in the correct inclination of exit surface 7 and therefore of the surface normal 6 thereof relative to the longitudinal axis 8 of fiber 4, in which a laterally correctly aligned position of the light spot is achieved by this adjustment of the angle $\alpha$.

During this process, it is also possible to optimize the shape of the exit surface 7 of fiber 4. For example, if the light spot 10 exhibits an excessively ellipsoidal shape, the exit area 7 can be provided with a convex shape like that of a cylindrical lens so that a more circular and less ellipsoidal spot 10 can be achieved on converter 3. Here, the symmetry axis of the convex exit surface of cylindrical shape extends perpendicular to the direction of the larger main axis of the light spot ellipsoid.

Once the shape of an exit surface 7 has been optimized, it can then be transferred to further assemblies to be produced, for example.

In this way, it is possible to obtain not only cylindrical but also spherical and aspherical exit surfaces 7, and also exit surfaces of free shapes, by using image capturing device 27 and process control device 28, in particular also by successive optimizing.

The shape of exit surface 7 can thus be formed according to a predefined processing geometry, and also by using feedback by measuring the actual fraction of useful light.

In particular in case of multi-stage successive processing, a significantly optimized fraction of useful light is achieved, in particular also by considering the optical and geometric properties of the actually used converter 3 and the actually used fiber 4, since the alignment is made not only with respect to the position of light spot 10 but also with respect to an overall improved useful light fraction and since in particular all properties of optical converter 3 and fiber 4 can be taken into account.

Since fiber 4 usually does not have an inclined exit surface 7 prior to the processing, the exit surface 7 of fiber 4 will only be processed during the alignment such that the angle $\alpha$ of the exit surface and/or the shape of exit surface 7 is modified as described above.

In this case, according to a further embodiment, the fiber 4 can first be processed during the alignment in a material removing manner so that a planar surface is achieved which extends at an adjusted angle $\alpha$ in accordance with a correct alignment, and then a non-planar shaping, in particular a curvature can be produced in the exit surface 7 of fiber 4 by further material removing processing, in particular using laser light, whereby the fraction of the useful light that is exiting from converter 3 can be increased.

During this material removing processing, it is also possible to adjust the spacing between the exit surface 7 of fiber 4 and the optical converter 3, the spacing between fiber 4 and optical converter 3 indicating the optically effective distance between the exit point of main ray 9 from fiber 4 and the optical converter 3. Since the light that is exiting from fiber 4 has a defined opening angle which substantially corresponds to the effective numerical aperture which is determined and thus selectable by the injection, by the ability of the fiber 4 to guide light, and by its exit aperture, the adjustment of the spacing also permits to modify and thus align the size of the light spot 10 on the optical converter 3.

During the material removing processing, the light guiding core of fiber 4 is processed, and preferably also the sheath structures thereof.

Figure 5:
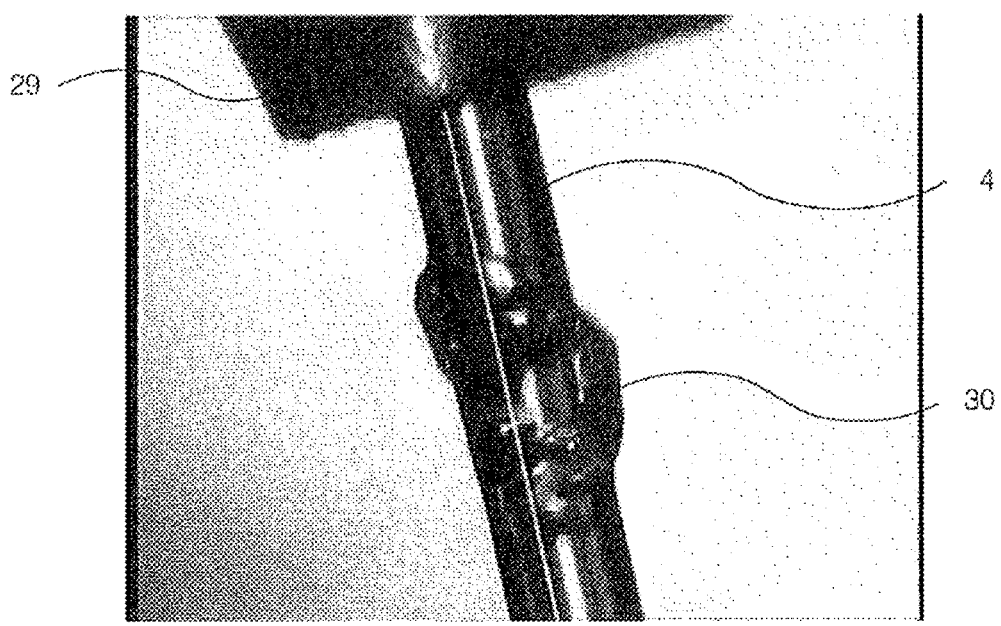
FIG. 5 shows an optical fiber arranged in its holder, with remaining contamination residues on the fiber, despite the removal of the outer fiber sheath, also referred to as cladding.
Figure 6:
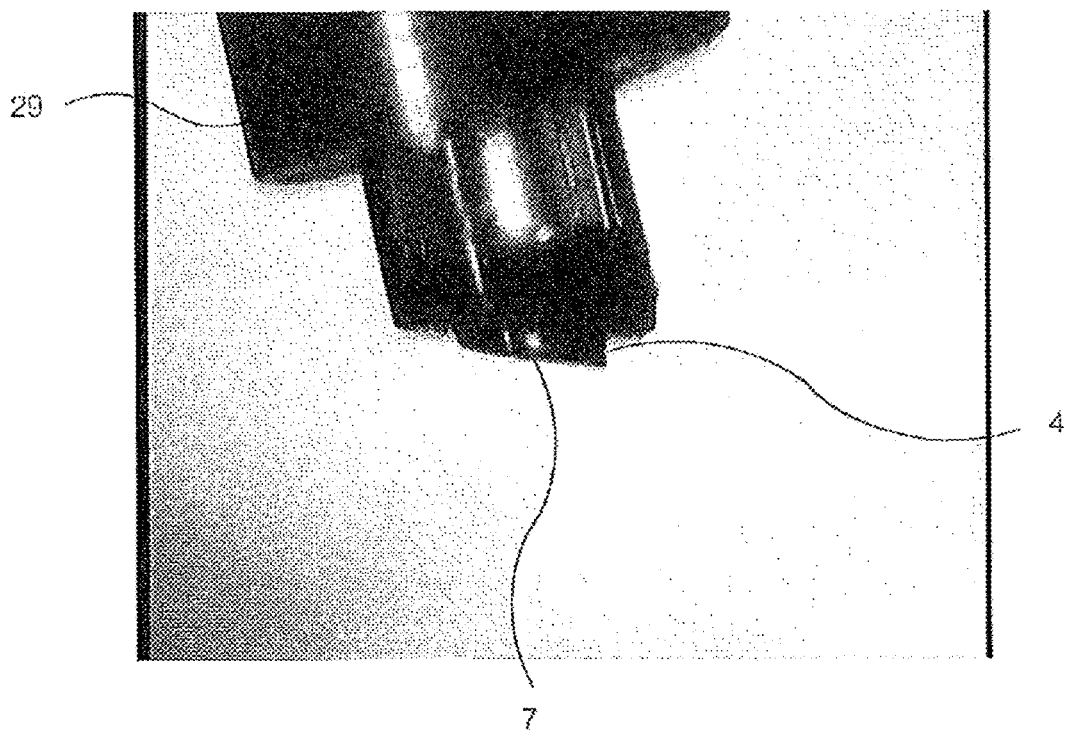
FIG. 6 shows an optical fiber arranged in its holder, where constituents of the fiber were processed in a material removing manner using laser light and the exit surface of the fiber was adjusted at an angle α without removal of the outer fiber sheaths.

FIG. 5 shows an optical fiber 5 arranged in its holder 29, with remaining contamination residues on the inner fiber sheath that surrounds the light guiding fiber core, despite the removal of its outer fiber sheaths, also referred to as cladding.

This example shows a further advantage of the method described above, because these remaining contamination residues 30 have substantially no influence on the adjustment of the angle $\alpha$ and on a correct alignment of light spot 10.

Figure 7:
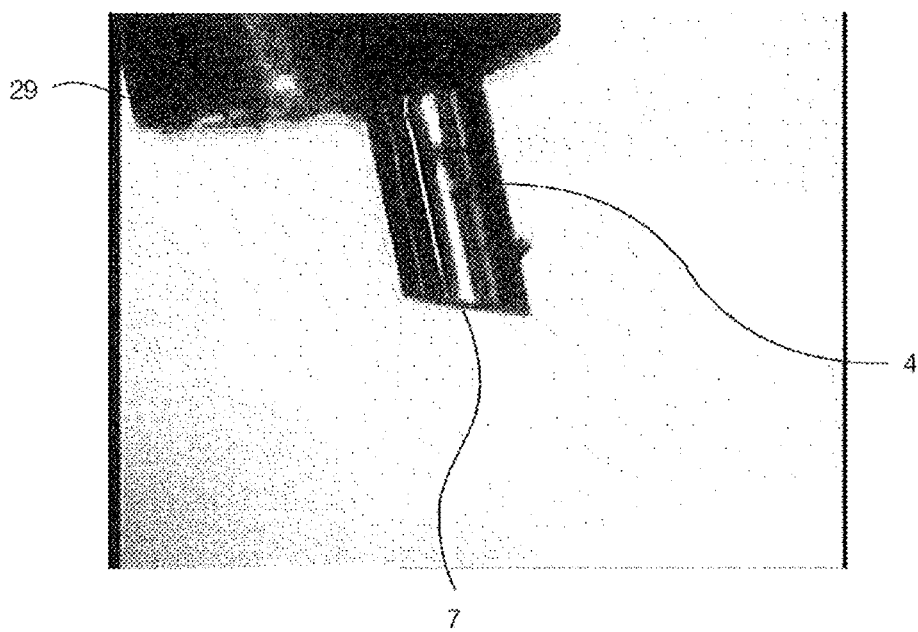
FIG. 7 shows an optical fiber arranged in its holder, where constituents of the fiber were processed in a material removing manner using laser light and the exit surface of the fiber was adjusted at an angle α after removal of the outer fiber sheaths.

Due to the material removing processing by means of $CO_2$ laser 23, these contaminations can usually be neglected, since they are also removed. Furthermore, in case of pulsed laser operation it may even happen that such contaminations are removed by vibrations that are introduced into the fiber and that may arise during the vaporization of the fiber material, as can be seen in FIG. 7, for example, which also shows an optical fiber 4 arranged in its holder 29, where constituents of the fiber 4 were processed in a material removing manner using laser light and the exit surface of the fiber was adjusted at an angle $\alpha$.

Figure 8:
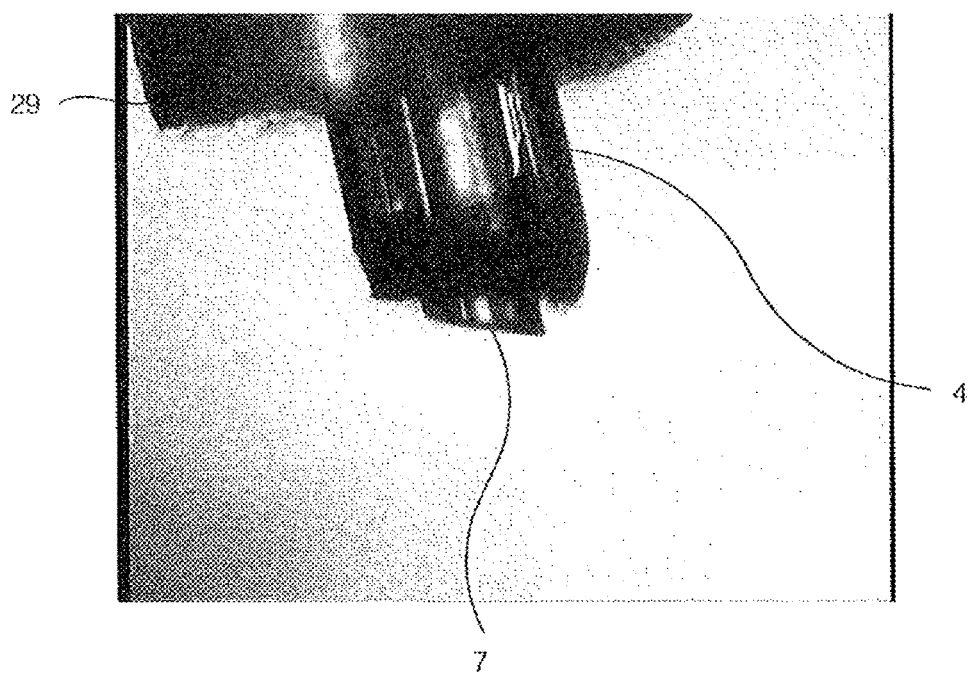
FIG. 8 shows a further optical fiber arranged in its holder, where constituents of the fiber were processed in a material removing manner using laser light and the exit surface of the fiber was adjusted at an angle α without removal of the outer fiber sheaths.

FIG. 8 shows a further optical fiber 4 arranged in its holder, where constituents of the fiber 4 were processed in a material removing manner using laser light and the exit surface 7 of the fiber was adjusted at an angle α, without removing the outer fiber sheaths.

In the preferred embodiments, the fiber 4 is fixed in its holder 29, as will be described in more detail below with reference to the preferred embodiments, and once fixed in the holder the angle α is adjusted and the position of light spot 10 is aligned, although the angle α might as well be introduced without prior fixing of the fiber 4 and the fiber could be accommodated in its holder 9 later.

At least in the preferred embodiments, it is ensured in this way that after the alignment the position of light spot 10 on converter 3 already corresponds to the final position and that the final finished product will have this correct alignment as well.

Figure 9:
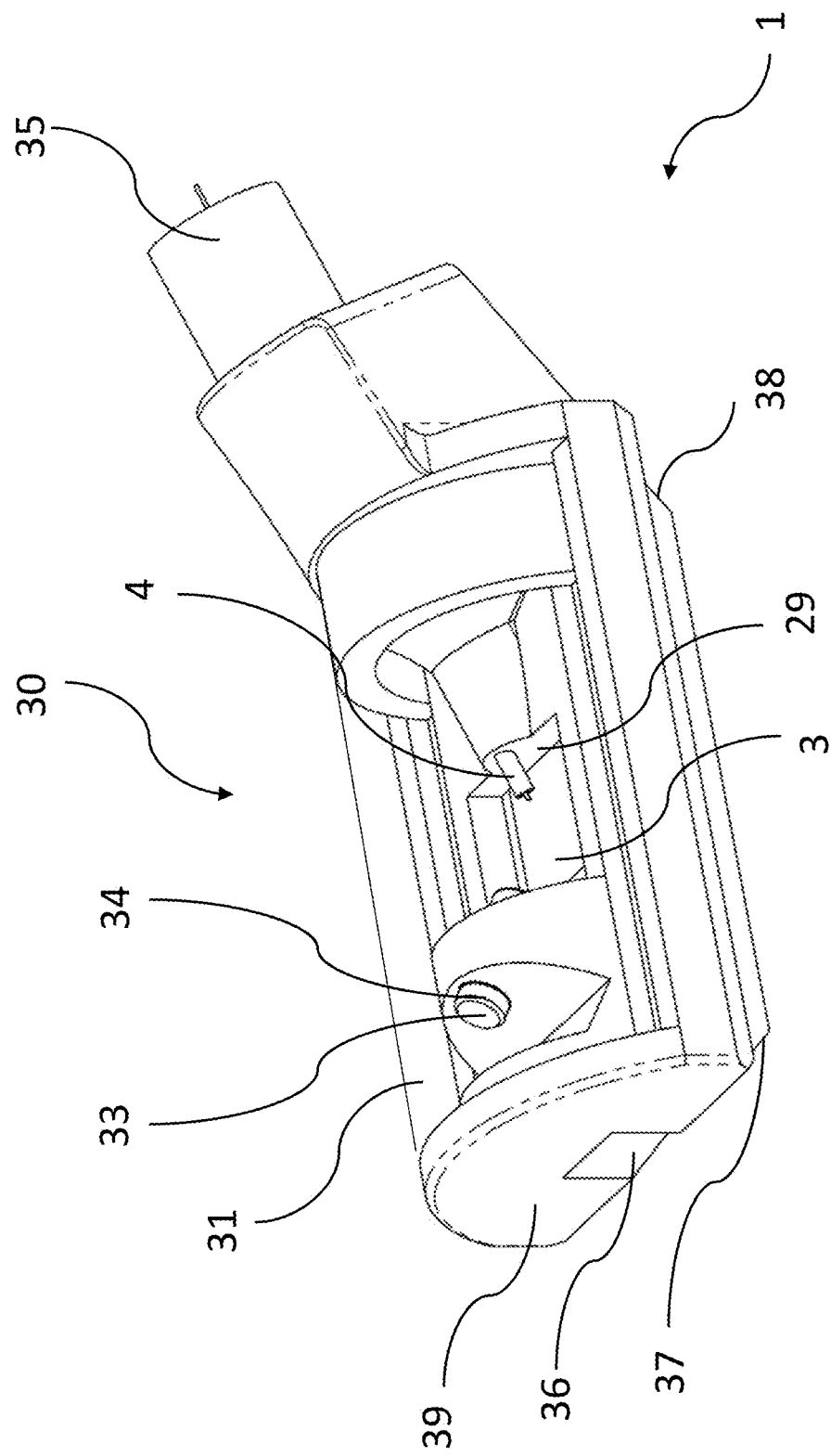
FIG. 9 is a perspective schematic view, obliquely from above, of the fiber-optical light exit head of a fiber-optic conversion module of a first embodiment.

Referring now to FIG. 9, which shows a perspective schematic view, viewed obliquely from above, of a fiber-optical light exit head 30 of a fiber-optic conversion module 1 according to a first embodiment.

The optical converter 3, and the holder 29 for fiber 4 with the fiber 4 arranged therein can be seen underneath a protective cover made of glass 31 which is arranged as an elongated sleeve in a monolithic body 32 which carries both the fiber 4 with its holder 29 and the optical converter 3.

Monolithic body 32 also supports a light trap 33 which has a plug-like element 34 at its end, which can be seen in FIG. 9 and will be described below in more detail with reference to FIG. 11.

By means of a sleeve 35 that is arranged in monolithic body 32, the fiber 4 can be held in a mechanically reliably manner on light exit head 30.

A fitting feature in the form of a rectangular recess 36 is provided on the lower face of monolithic body 32, which together with bevels 37, 38, and 39 of defined dimensions allows to mount the light exit head 30 on further assemblies (not shown in the figures) in a correct position. Thus, the position of the light spot 10 with high mechanical precision can also be used in the further assemblies (not shown), and the fitting feature 36 as well as the bevels 37, 38, and 39 are produced with mechanical tolerances of less than 50 μm, preferably less than 10 μm.

Figure 10:
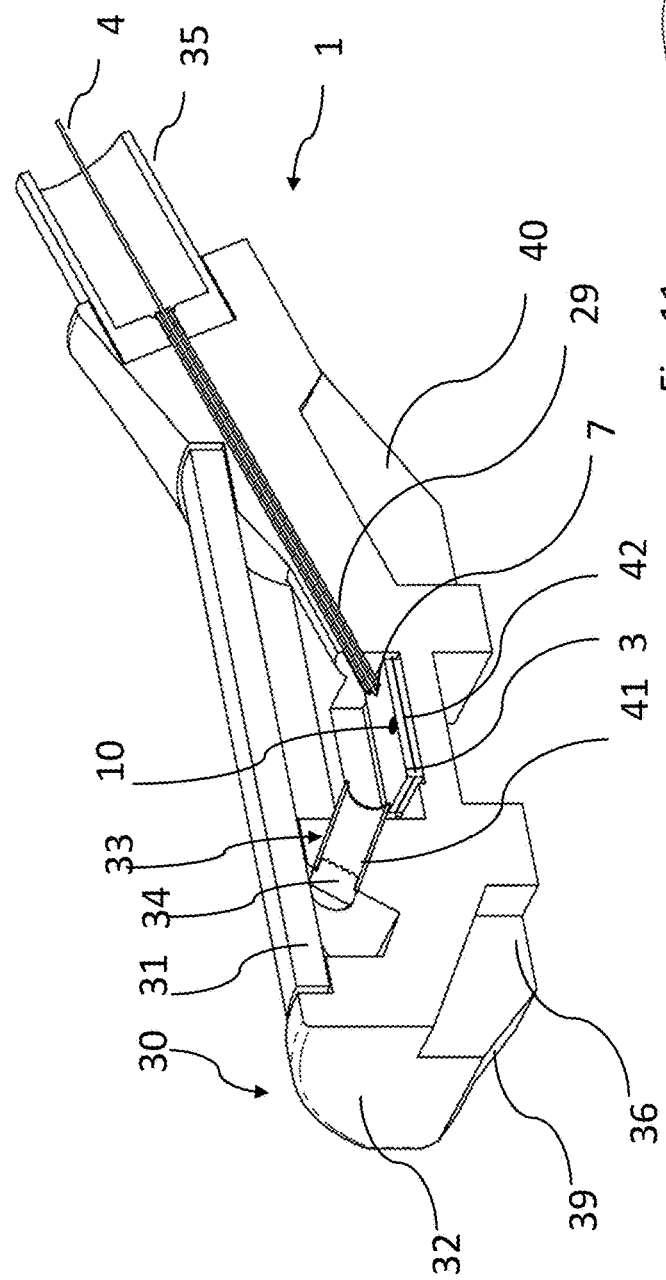
FIG. 10 is a horizontal perspective sectional view of the light exit head shown in FIG. 8, cut through the center of the fiber-optical light exit head and through the center of the fiber of the fiber-optic conversion module.

A further rectangular recess 40 which is provided in the monolithic body 32 can be seen in FIG. 10 which is a horizontal perspective sectional view of the light exit head 30 shown in FIG. 9, cut through the center of the fiber-optical light exit head 30 and through the center of the fiber 4 of the fiber-optic conversion module.

FIG. 10 only shows the fiber core of fiber 4, for the sake of simplicity. In this and all other embodiments described herein, the diameter of the light guiding core of the fiber may generally be about 3 μm to 1500 μm, preferably about 3.5 μm to 1000 μm, and most preferably about 50 μm to 150 μm.

As can be seen from FIG. 10, the light trap 33 comprises a sleeve 41 that is held in monolithic body 32 and at least partially accommodates the element 34 which is inserted into sleeve 41 in the form of a plug and can be attached to this sleeve due to a mechanical fit by press fitting, gluing, soldering, or else screwing. Sleeve 40 may have a blackened or roughened inner surface or may be provided with light traps (not shown in the figures), which may extend radially in the sleeve with a triangular profile.

The longitudinal or symmetry axis of sleeve 40 is oriented towards the light spot 10 of optical converter 3 and extends at an angle that corresponds to the reflection angle of the excitation light exiting from fiber 4 and reflected at optical converter 3. Thus, substantially all of the excitation light reflected at the optical converter 3 is absorbed by the sleeve 41 of light trap 33.

In the preferred embodiments, both the fiber 4 in its holder 29 and the optical converter 3 are arranged in the monolithic body 32 before and after the alignment, which monolithic body 32 is preferably produced by a powder metallurgical injection molding process, in particular by a metal injection molding (MIM) process and is therefore capable of providing high mechanical strength along with good thermal conductivity.

In particular solder connections can provide both a mechanically firm hold and a good thermal conductivity between the optical converter 3, a cooling body 42, and the monolithic body 32, so that the temperature of optical converter 3 remains within the desired thermal limits. Here, the heat to be dissipated can also be transferred through the monolithic body 32 to further assemblies (not shown in the figures).

The thermal conductivity $\lambda$ of monolithic body 32 together with cooling body 42 is greater than 200 W/(m*K), and preferably greater than 350 W/(m*K), which is the minimum thermal conductivity provided for optical converter 3, since the latter can additionally dissipate heat to the surrounding medium, which is usually air.

The optical converter 3 may alternatively be underlaid with a mirror and provided with a light shield in order to collect the fringe of converted yellow light which is present in excess for the white light generation.

In this embodiment and the further ones described herein, the alignment of the position of light spot 10 on optical converter 3 can be carried out before mounting the protective cover 31 as described above with reference to FIGS. 1 to 4. For this purpose, as shown schematically in FIG. 4, the light of a $CO_2$ laser is directed onto the end of fiber 4 in order to process the exit surface 7 thereof in a material removing manner.

After having being adjusted, the angle α can be about 10° to 30°, preferably about 15° to 25°, more preferably about 18° to 22°.

Here, the diameter of the light spot on the optical converter can have a size ranging from 0.5 μm to 800 μm, preferably from 1 μm to 500 μm, and most preferably from 5 μm to 300 μm, and it can also be adjusted by the geometric distance a of exit surface 7 of fiber 4 to optical converter 3. With the adjustment of the geometric distance a, the optically effective spacing is also adjustable, and this optically effective spacing, or only referred to as spacing, for short, between exit surface 7 of the fiber and the surface of optical converter 3, at which the light exiting from fiber 4 has its intensity maximum is between 200 μm and 2500 μm, preferably between 400 μm and 1500 μm, more preferably between 1500 μm and 800 μm, and most preferably between 600 μm and 1200 μm.

In all embodiments described herein, the lateral deviation of the position of the light spot on the optical converter, in particular after the alignment, is less than 200 μm, preferably less than 150 μm, and more preferably less than 100 μm.

Figure 11:
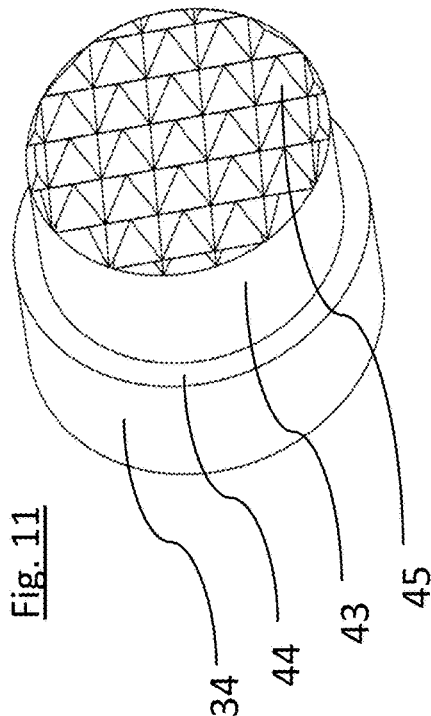
FIG. 11 is a perspective view, from above, of an element of a light trap of the fiber-optical light exit head illustrated in FIG. 9.

Referring now to FIG. 11, which is a perspective view illustrating the element 34 of light trap 33 of a fiber-optical light exit head 1 shown in FIG. 9.

This element has a flange 43 by which it is held in sleeve 40, and a limit stop 44 up to which it can be inserted into sleeve 40.

The side of element 34 facing the optical converter 3 after the assembly thereof in sleeve 40 defines a faceted scattering surface 45, may be provided with an absorbent coating, for example a matte black coating for the excitation light, and scatters and absorbs the reflected excitation light.

Preferably, element 34 and sleeve 40 are made of a metal so that the heat resulting from absorption on element 34 and in sleeve 40 can also be dissipated to monolithic body 32.

Figure 12:
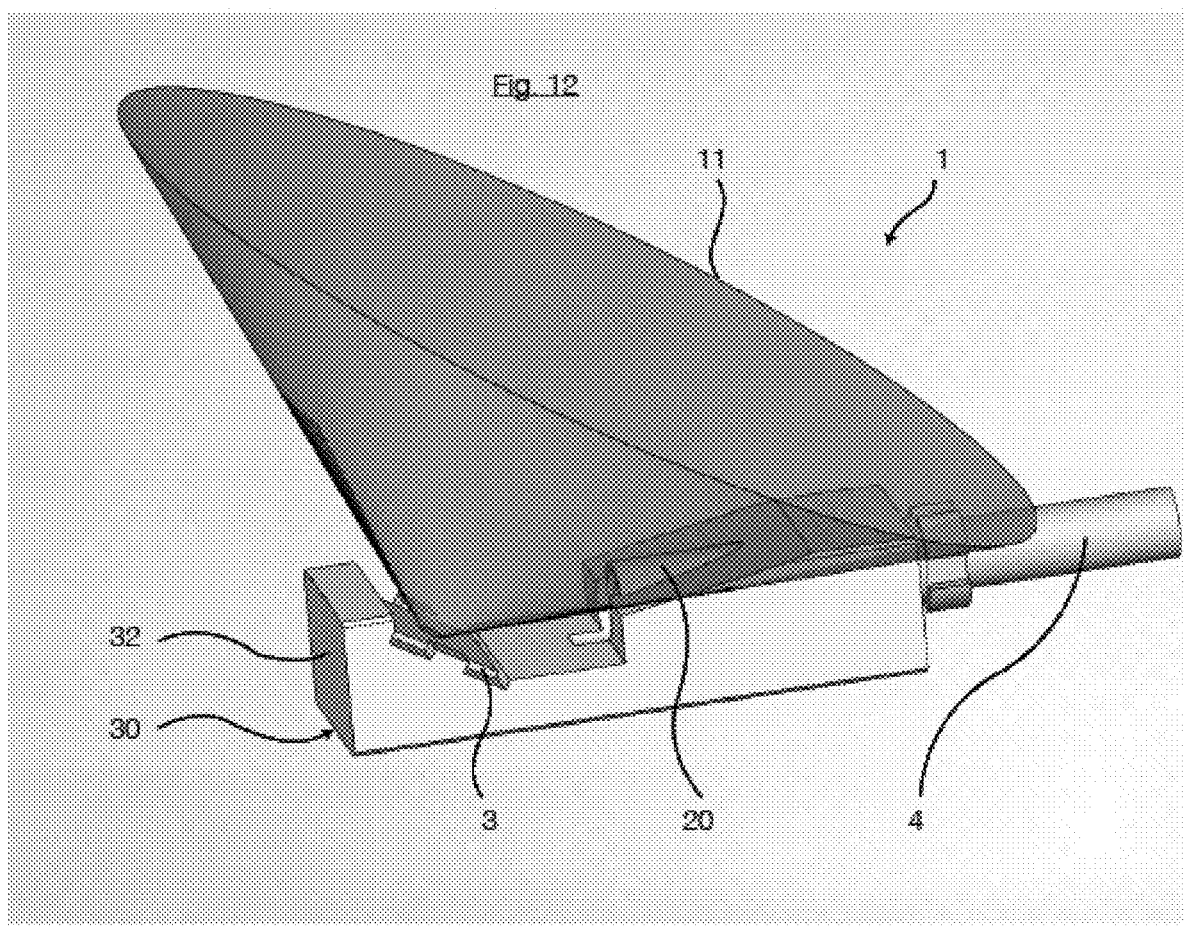
FIG. 12 is a perspective view, obliquely from above, of a light exit head of a fiber-optic conversion module of a second embodiment, with useful light exiting therefrom.

Referring now to FIG. 12, which is a perspective schematic view obliquely from above, illustrating the light exit head 30 of a fiber-optic conversion module 1 of a second embodiment, with useful light 11 exiting therefrom.

This figure shows clearly that the cone of useful light 11 can extend as far as to the holder 20 of fiber 4, or 18, and that the advantage of reduced shading of useful light already described with reference to FIG. 2 is provided by virtue of the inclined exit surface 7.

Figure 13:
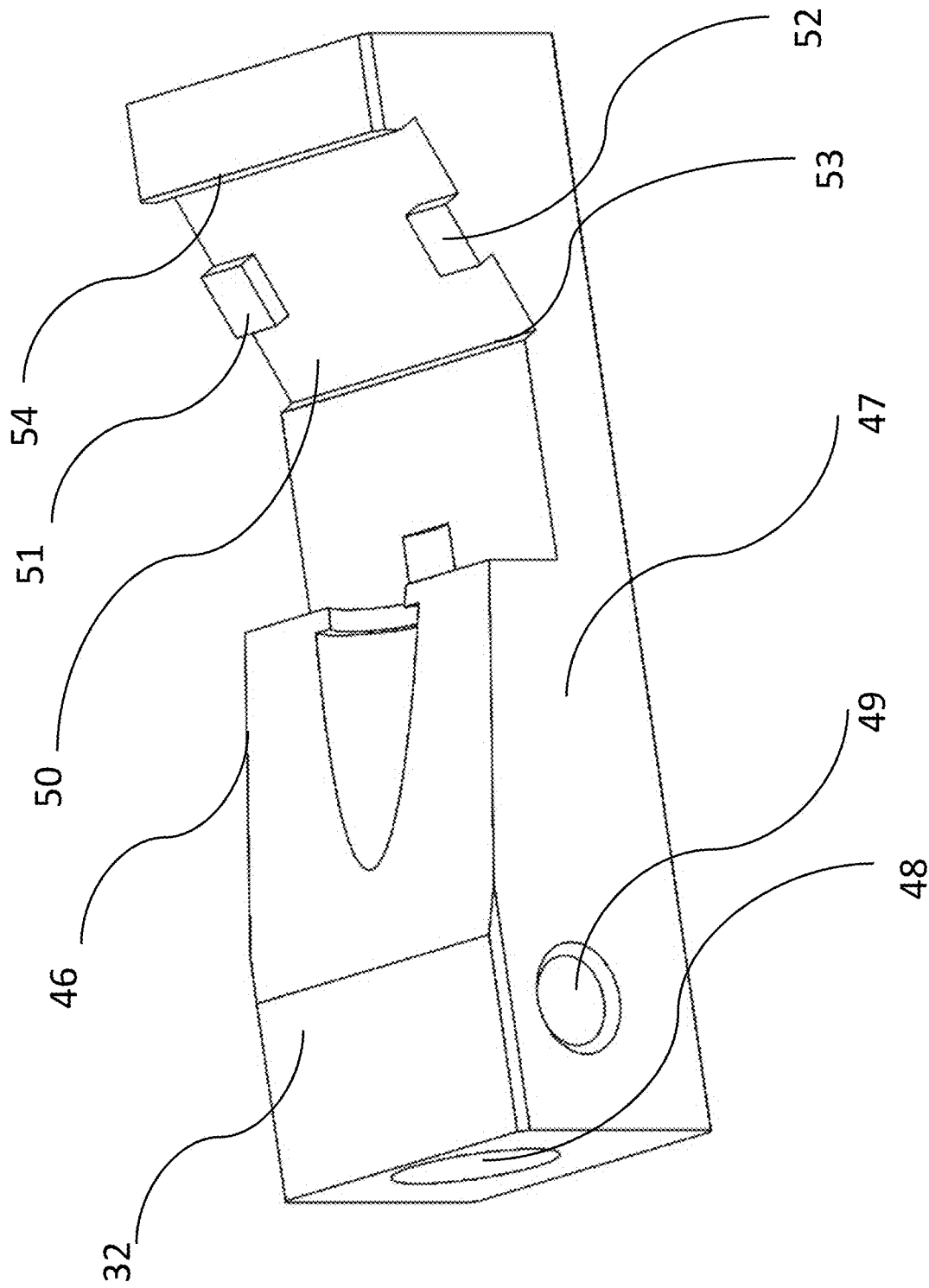
FIG. 13 is a perspective view, obliquely from above, of a monolithic body of the light exit head of the fiber-optic conversion module of the second embodiment illustrated in FIG. 12, but without a fiber held therein or thereon and without an optical converter held thereon.

A further advantage of this embodiment can also be seen from FIG. 13, which is a perspective schematic view, obliquely from above, of the monolithic body 32 of light exit head 30 of fiber-optic conversion module 1 of the second embodiment shown in FIG. 12, but without the fiber being held therein or thereon and without the optical converter being held thereon.

In this embodiment, the monolithic body 32 has two substantially planar lateral surfaces 46, 47 and can be produced as an extrusion product. When the monolithic body 32 of this embodiment is produced as an extrusion product, a multitude of these monolithic bodies may be provided with respective openings 48 and 49 and with the holder 50 for the optical converter 3 before they are separated along lateral surfaces 46 and 46.

Furthermore, prior to this separation, the optical converter 3 can already be arranged between its framing features 51, 52 in the form of elevations and between the strip-shaped protrusions 53, 54, and can then be processed along with a multitude of further monolithic bodies, for example by a heat treatment if solder connections are used.

Figure 14:
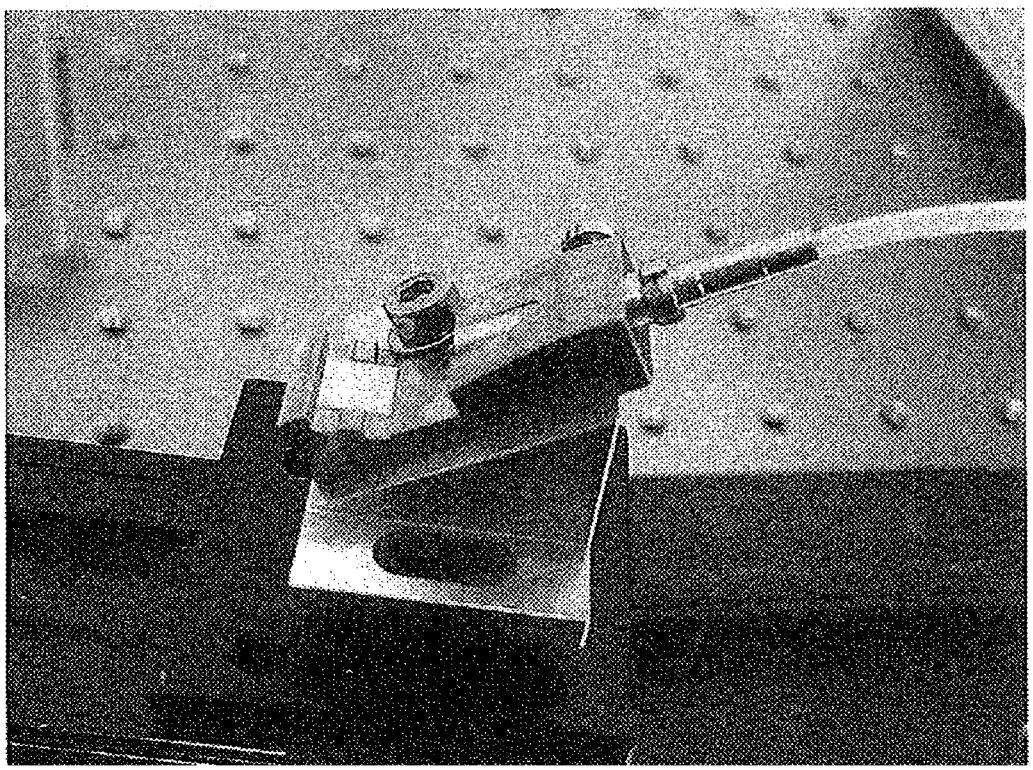
FIG. 14 is a photograph, obliquely from above and from a lateral side, of the fiber-optical light exit head illustrated in FIG. 11 held in a test arrangement.
Figure 15:
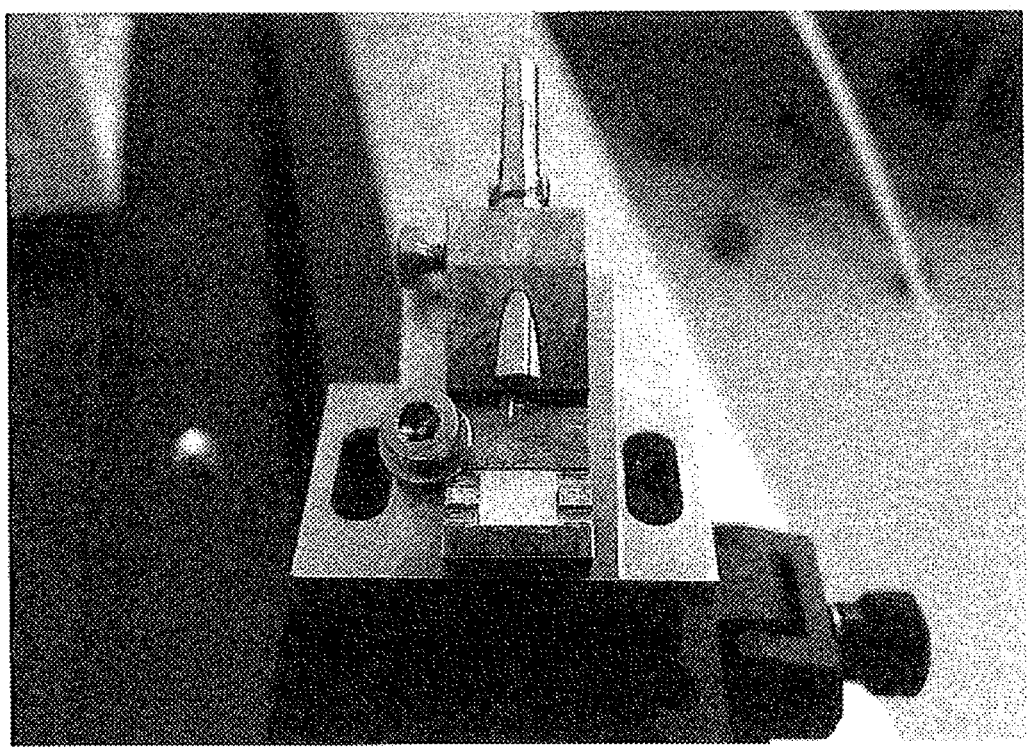
FIG. 15 is a photograph, obliquely from above and from the front, of the fiber-optical light exit head illustrated in FIG. 11 held in a test arrangement.

Referring now to FIGS. 14 and 15, wherein FIG. 14 is a photograph, obliquely from above and from a lateral side, of the fiber-optical light exit head illustrated in FIG. 11, which is held in a test arrangement, and FIG. 15 is a photograph, obliquely from above from the front, of the fiber-optical light exit head of FIG. 11, in which the latter is also held in a test arrangement.

FIG. 16 illustrates the dimensions of a light spot 10 as obtained on optical converter 3 with the preceding embodiment. A typical brightness distribution of the light spot 10 on optical converter 4 is shown as produced in the embodiments illustrated above and below by the light which is exiting from fiber 4 and is incident on optical converter 3, together with a length scale with scaling marks of 100 µm spacing.

FIG. 17 shows a perspective view, obliquely from above, of the light exit head 30 of a fiber-optic conversion module 1 of a third embodiment.

In this embodiment, the protective cover made of glass 31 is of tubular design, with a closed rounded end and an open end, and extends over more than half of the length of monolithic body 32.

Thus, a lamp bulb-like configuration is obtained, which allows the light exit head 30 to be inserted in reflectors along its longitudinal extension, which reflectors preferably include further light-guiding elements, such as deflecting mirrors, in order to be able to exploit the emitted useful light the most completely possible.

For holding the light exit head of this embodiment in a mechanically exact manner, mating surfaces 58 and 59 are provided, mating surface 59 cooperating with a further mating surface 60 (not shown in this figure), with which it forms an approximately V-shaped arrangement.

Furthermore, accurately fitting inclined surfaces 61 and 62 are provided in order to correctly position the light exit head 30 along its longitudinal extension.

With reference to FIG. 18, it can furthermore be seen that the fiber 4 extends in its holder 29 nearly in parallel to the longitudinal direction of monolithic body 32, and that the optical converter 3 is held inclined at an angle $\vartheta$ relative thereto.

The sleeve 35' for holding fiber 4 is not a separate component in this embodiment but is provided in the form of a substantially equivalent cylindrical opening in the monolithic body 32.

The element 34 of light trap 33 as illustrated in FIG. 19 also has structural differences compared to that of FIG. 11 regarding the respective faceting.

The element shown in FIG. 11 uses a respective substantially pyramidal facet for scattering and absorbing the light, whereas the element 34 of FIG. 19 uses a radially extending rib structure for the same purpose, with a radial center coinciding with the longitudinal axis of this element 34.

A preferred embodiment is shown in FIG. 20, which is a perspective view, obliquely from above, illustrating the fiber-optical light exit head 30 of a fiber-optic conversion module 1 according to a fourth embodiment.

Figure 21:
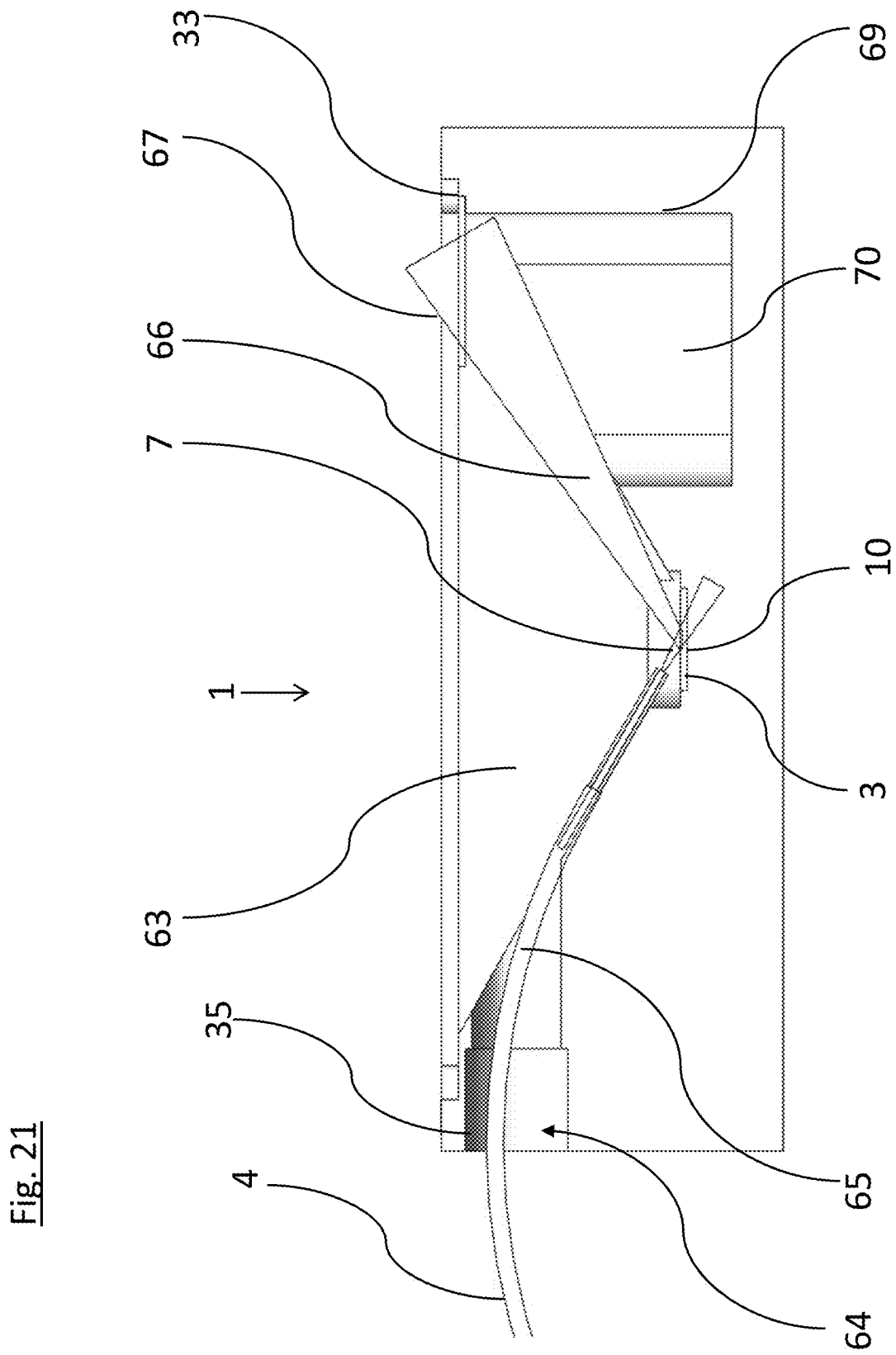
FIG. 21 is a horizontal two-dimensional sectional view of the fiber-optical light exit head of FIG. 20, cut through the center of the fiber-optical light exit head and through the center of the fiber of the fiber-optic conversion module.

The monolithic body 32 of this embodiment has a substantially frustoconical opening 63, with the optical converter 3 held at the bottom thereof. Fiber 4 is routed into the interior of frustoconical opening 63 through a passage opening 64 which defines a radially extending groove 65 as a holder for fiber 4, which can be seen more clearly in the sectional view of FIG. 21. FIG. 21 is a horizontal two-dimensional sectional view of the fiber-optical light exit head 30 shown in FIG. 19, cut through the center of fiber-optical light exit head 30 and through the center of fiber 4 of fiber-optic conversion module 1.

FIG. 21 shows particularly clearly the effect of light trap 33, which prevents excitation light 66 that is reflected by optical converter 3 from leaving the light exit head 30, as in all embodiments illustrated herein. In this embodiment, a Fresnel zone plate 67 is used to direct the reflected excitation light 66 into an opening 68 where it can be absorbed at the lateral walls 69 and the bottom surface 70 thereof, and the heat generated thereby is absorbed by monolithic body 32.

Figure 22:
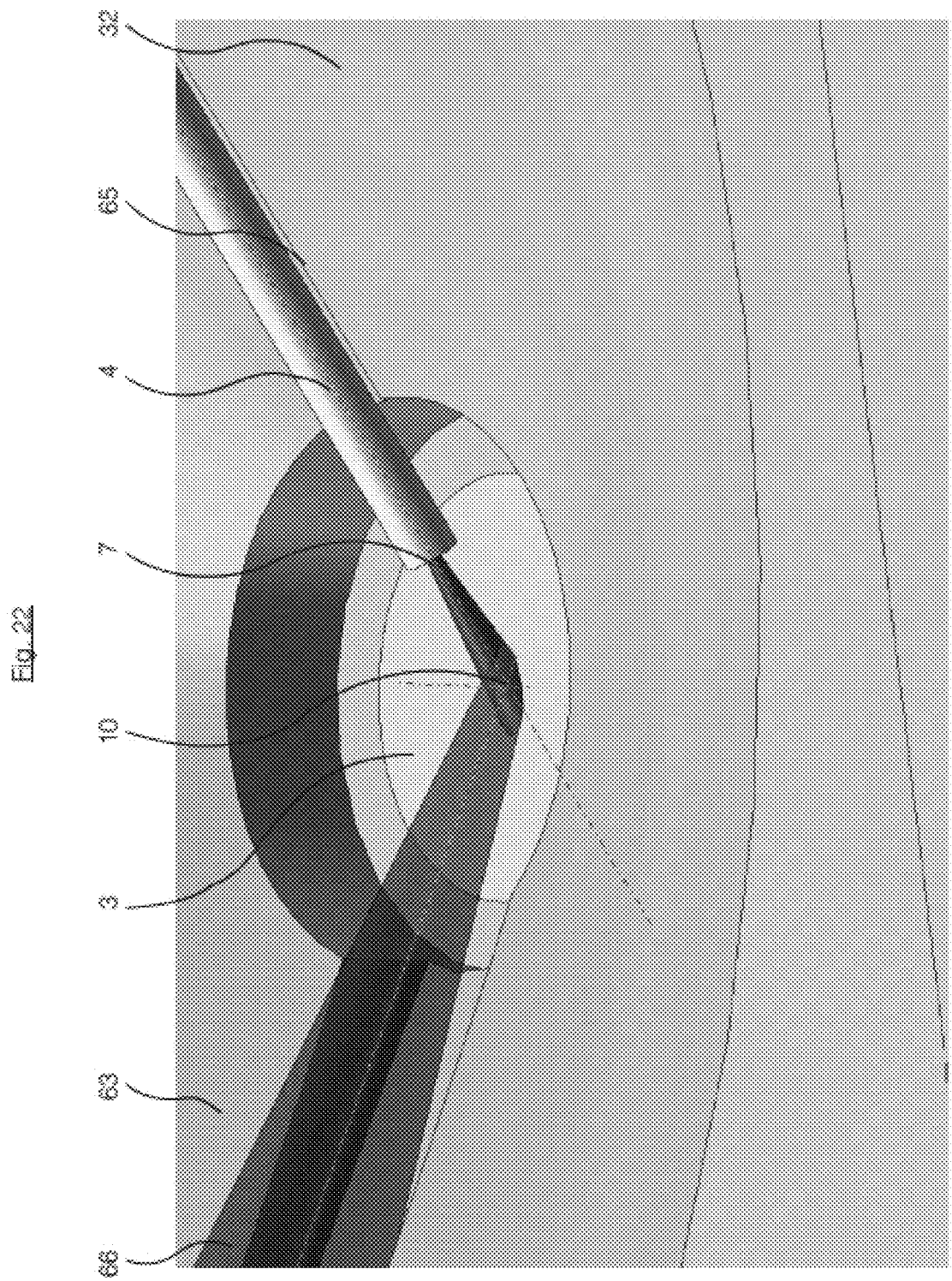
FIG. 22 is a view of a detail of the schematic view of the fiber-optical light exit head of the fourth embodiment shown in FIG. 20.

FIG. 22 shows a view of a detail of the schematic view of the fiber-optical light exit head of the fourth embodiment as shown in FIG. 19, but in a perspective view, so that in particular the reflection behavior of optical converter 3 with regard to the excitation light is particularly clearly visible.

In this embodiment, the position of the light spot 10 on optical converter 3 is also aligned as described above by processing the exit surface 7 of fiber 4 in a material removing manner, although the exit surface 7 which is inclined at an angle α relative to the longitudinal axis 8 of fiber 4 is covered by the outer sheath structures of fiber 4 and is therefore not visible.

Also, the present invention is not limited to the use of only one fiber in a fiber-optic conversion module 1.

As described above, it is possible to align the position of the light spots of a plurality of light sources, in particular excitation light sources, on the optical converter 3.

With respect to the spatial geometric configuration and further properties of the components used therefore, reference is made to International Patent Application WO 2014/049056 of the same applicant, which is fully enclosed into the subject matter of the present disclosure by reference.

Accordingly, a device is provided which comprises more than one light guide, from each of which light exits and is incident on an optical converter 3 to at least a substantial fraction, thereby forming a light spot 10 thereon, wherein the exit surface 7 of fiber 4 has an angle α relative to the longitudinal axis 8 of fiber 4 which is different from 0° in each case, and wherein the position of the light spot 10 on converter 3 is preferably also aligned by adjusting the angle α, and the respective light spots 10 are superimposed on optical converter 3 at least to a substantial fraction.

Particularly advantageously, the fiber-optic conversion modules 1 with their light exit heads 30 as described above can be assembled in headlights or may constitute functional components thereof.

Accordingly, the invention also comprises corresponding headlights of an aircraft, a water vehicle or a land-borne vehicle that include such fiber-optic conversion modules.

Also, a projection device with corresponding fiber-optic conversion modules 1 are also the subject matter of the present invention, in particular digital projection devices, and in particular also spotlights for theater, shooting, and stage.

Figure 23:
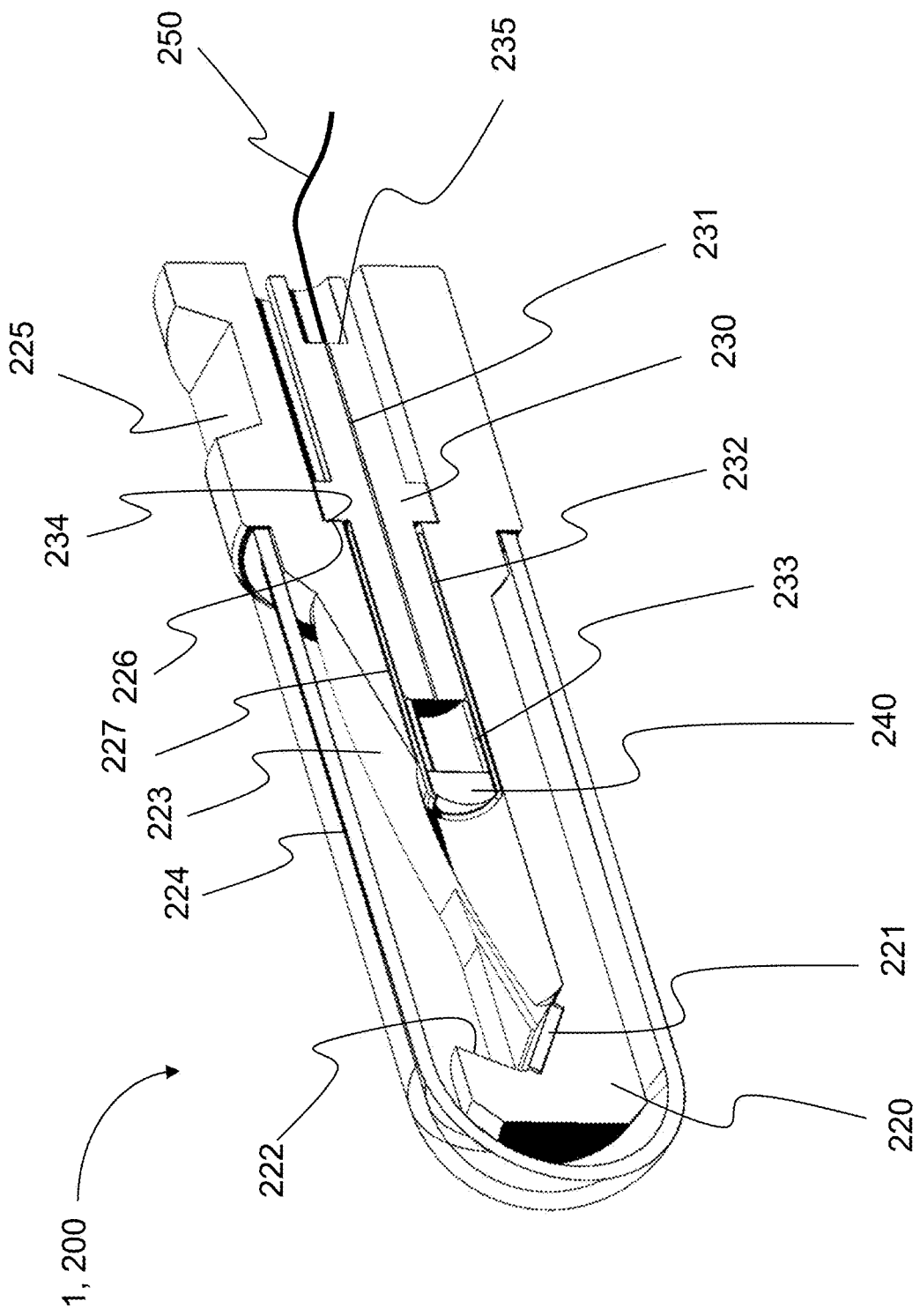
FIG. 23 is a longitudinal sectional view of a fiber-optic conversion module in a first exemplary embodiment.

According to a further aspect of the invention, the object to provide a fiber-optic conversion module of simple configuration, which is suitable as an assembly component between an excitation light source and a headlight in a lighting device for emitting useful light, and which provides for good heat dissipation, is achieved by a fiber-optic conversion module for use as a headlight as shown in FIG. 23 by way of example.

Thus, in the example illustrated in FIG. 23 the entire fiber-optic conversion module of this further embodiment denoted by reference numeral 1 is already configured as a lighting device 200 and is shown in a final assembled form ready for being installed. Conversion module 1 is shown in a longitudinal sectional view.

The lighting device 200 is substantially in the form of a bulb cone and can easily be inserted and mounted in a car headlight.

The conversion module 1 according to the invention comprises a support element 220, a light exit head 230 and a fiber-optical light guide 250, also referred to as light guiding fiber below. To simplify the precise positioning of lighting device 200 in the car headlight, a recess 225 is provided on support element 220 for fixation to corresponding reference surfaces so that a simple and rapid assembly is feasible.

The light guide 250 is provided with a plug (not shown) at its light entry end, for being coupled to an associated excitation light source (not shown). The plug is preferably a plug comprising a ceramic ferrule, which has a diameter of higher accuracy and exhibits less eccentricity compared to an SMA plug, and which is configured for being coupled to a laser diode which injects its excitation light into the light guiding fiber 250. Such a ceramic ferrule significantly facilitates the assembling so that a complex alignment can be avoided. Light guide 250 is routed to the light exit head 230 without sharp bends, with a certain curvature being generally harmless and unavoidable. The light guiding fiber 250 leads to light exit head 230 where it is fixed and retained.

Support element 220 is equipped with a converter 221 which is arranged so that the excitation light exiting from light guiding fiber 250 is obliquely incident thereon.

Accordingly, the excitation light exiting from light guide 250 is obliquely incident on converter 221 which converts the shorter wavelength excitation light into longer wavelength conversion light, but also scatters excitation light, so that the remitted light is on average a useful light of longer wavelengths. For the useful light, a white light character is usually sought. If the headlight is intended to produce substantially parallel useful light, a preferably small light spot is produced on converter 221.

Light exit head 230 is in the form of a rotationally symmetrical cone in the example. Light exit head 230 is of low complexity and can therefore be easily produced in large quantities at low cost.

Support element 220 is accordingly provided with a bore 227 which is also rotationally symmetrical and which has a shape accurately fitting in complementary manner to the outer contour of light exit head 230. Bore 227 and the outer diameter of the light exit head in the connection area are produced with close tolerance, for example a dH7/m6 transition tolerance, allowing for easy assembly by applying slight pressure. In this way, the light exit head 230 can be precisely inserted into bore 227 and then fixed. Fixing can be achieved in the intended position by gluing. However, clamping or screwing may be envisaged as well.

The light exit head 230 has a central axial through bore with an insert element 231 in the form of a sleeve. This insert element 231 serves to accommodate the light exit end of light guiding fiber 250. The light guiding fiber 250 can be slidingly introduced into insert member 231 such that the light guiding fiber 250 ends flush at the converter-side end of the insert element.

For exactly positioning the light exit head 230 in bore 227 of the support element, the support element 220 is formed with a circumferential limit stop 226 which engages on a likewise circumferential protrusion 234 of light exit head 230 when the light exit head is assembled.

Furthermore, a rotationally symmetrical insert element 232 is provided as a fixing aid, which is also provided in the form of a sleeve and has a first portion enclosing in flushing manner the front portion of the light exit head facing the converter. The outer sheath surface of insert element 232 is in contact with bore 227 in its assembled position. A second portion of the insert element 232 opposite to the first portion is configured to receive and hold an optical element 240. The optical element 240 is thus located in the direct beam path of the excitation light. In order to achieve a predetermined spacing between the light exit end of light guide 250 and the optical element 240, a spacer 233 is provided which is disposed inside the insert element between light exit head 230 and optical element 240.

In this way, an light exit head 230 can be provided ready for being assembled, which can be produced at low cost and which serves, on the one hand, to hold and fix a light guide 250 for supplying excitation light, and on the other hand also provides an optical element 240, preferably for focusing the excitation light onto a converter 221.

In addition to the possibility of rapid replacement of the light exit head, this embodiment offers the further advantage that the axial spacing between the light exit end of light guide 250 and optical element 240 can be changed by selecting spacer members 233 of different lengths, and/or that the axial spacing between the light exit end of light guide 250 and the converter can be changed by changing the position of light exit head 230 in the bore 227 by selecting insert elements 232 of different lengths.

For the optical element 240, a focusing optical element is provided in the example, preferably a rod lens. The optical element 240 is arranged coaxially to light guide 250. Optical element 240 is used to focus the excitation light on the converter. For this purpose, the rod lens is designed with a plane polished light entry surface and a lens-shaped curved light exit surface.

The overall cone-shaped configuration of conversion module 1 entails a likewise cone-shaped configuration of support element 220 and lighting device 200.

To simplify the assembly of light guide 250 in the light exit head 230, a mounting shaft 235 is provided which allows the light guide 250 to be introduced particularly easily.

The light exit head 230 which is assembled along with support element 220 ensures that the light exit end of light guide 250 directs the excitation light onto a light spot which is located on the surface of converter 221. The longer wavelength useful light is emitted by the light spot in the form of a light cone. The light cone has an opening angle of at least 50°, preferably at least 60°, and more preferably at least 70°. Support element 220 furthermore comprises a reflective surface 223 for reflecting useful light.

In order to prevent the reflected shorter wavelengths excitation light of from exiting, the support element is provided with a light shield 222 which is effective as a light trap and can be designed as a scattering body or comprise a scattering body which causes the excitation light to die out. In this way, leakage of reflected excitation light can be prevented.

The interior of support element 220 including the converter 221 is enclosed by a transparent protective cover 224 for protecting the converter. In this way, the converter 221 can be optimally protected against particles that could otherwise enter, and also from moisture. The transparent protective cover 224 is made of glass and is tightly connected to support element 221. Thus, the protective cover preferably provides at least IP 44 protection in compliance with DIN EN 60529. In this way, the light exit end of light guide 250 and/or the optical element 240 are also optimally protected against dust and moisture.

In the present example, support element 220 is made as a metallic sintered body. To be produced as such a sintered body is particularly suitable for support element 220, since a sintered component can be produced with high accuracy and moreover exhibits high temperature resistance that will occur during the operation of the converter.

Alternatively, however, the support element 220 may as well be made of another material, such as a heat-conductive material, in order to dissipate the high temperature of the converter while operating. By contrast, the light exit head 230 can be made of other materials, for example of inexpensive plastic materials, since the heat load caused by the operation of converter 221 is lower in this case.

The useful light passes through protective cover 224 to the utility device section (not shown), which in the case of a headlight is a parabolic mirror, a segment of a parabolic mirror, or a modified parabolic mirror surface.

In the present example, the spacing between optical element 240 and converter 221 is about 70 mm. With such spacing, it is usually sufficient if the feasibility of axial alignment is in a range from 0.05 mm to 5 mm, preferably in a range from 0.03 to 4 mm, in order to achieve exact axial positioning of the light exit end of the optical fiber with respect to the converter 221.

Figure 24:
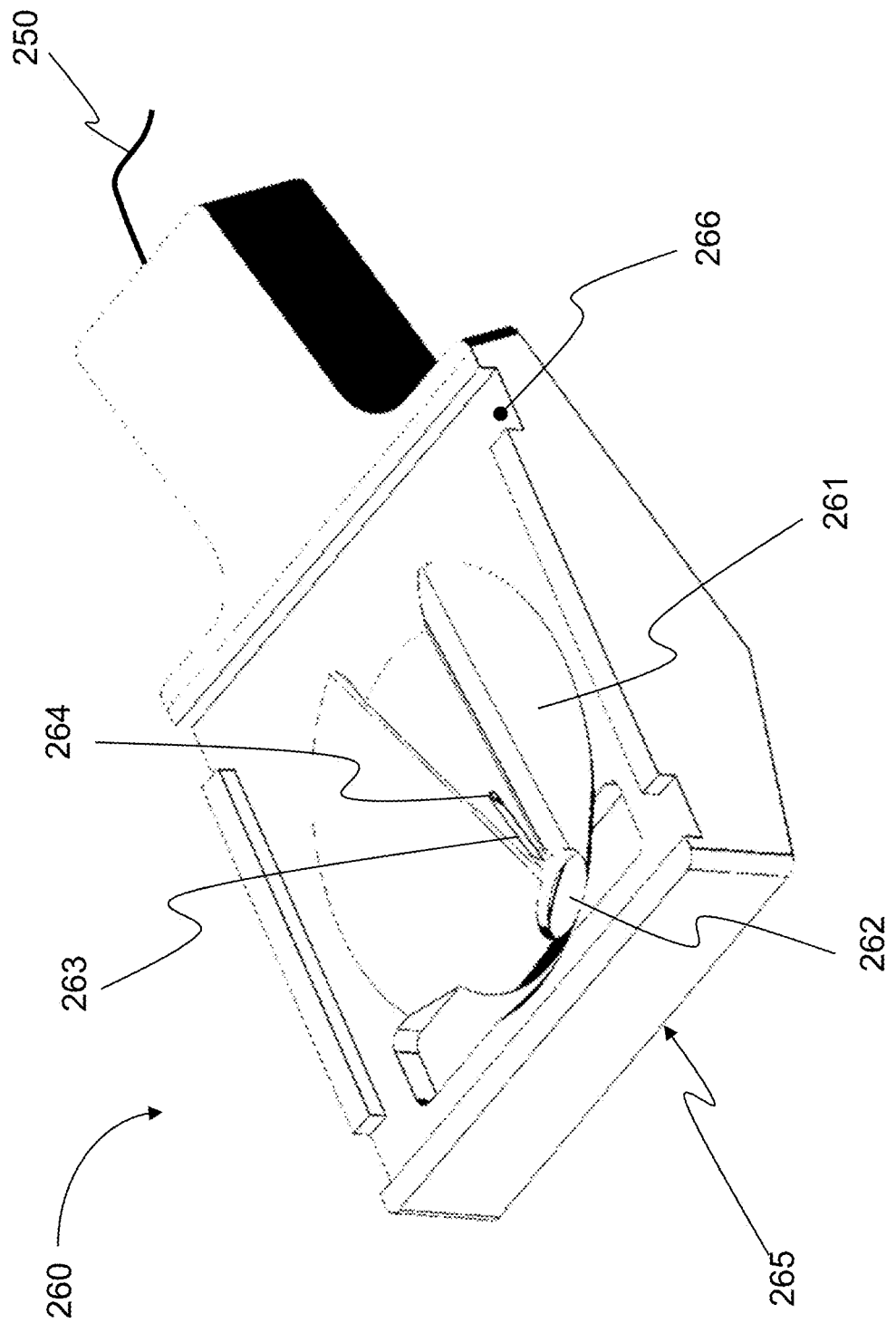
FIG. 24 is a schematic oblique view of a fiber-optic conversion module in a further exemplary embodiment.

FIG. 24 shows yet another exemplary embodiment of a conversion module, in a schematic oblique view.

A light exit head 260 is illustrated, which has an area that is configured as a parabolic reflector 261. In the center of reflector 261 a circular opening 262 is provided in which the converter (not shown) can be placed. The support element supporting the converter is not shown either, for the sake of clarity.

The surface of reflector 261 is interrupted by an elongated slit 263 radially extending towards opening 262 and being provided close to the center of the reflector. Slit 263 allows the excitation light exiting from the light exit end of light guide 250 to be radiated onto the converter. Accordingly, the slit extends towards the converter 221 in beam direction.

Light guide 250 is connected to the light exit head 260 using an insert element (not shown) like illustrated in the previous exemplary embodiment.

In this way, axial displaceability is provided here as well, for positioning the light exit end of light guide 250 with respect to the converter. Furthermore, an optical element 264 is also provided, for focusing the excitation light onto the converter. Optical element 264 is arranged in such a manner that it does not protrude into the reflector area. In this way, shading of the useful light is largely avoided.

In an embodiment which does not comprise an optical element 240, 264, the light exit end of light guide 250 can be brought closer to converter 221. It should be ensured that the light exit end does not cause greater shadings by protruding excessively into the emission light cone of the converter. In order to allow for sufficient focusing of the excitation light on the converter in spite of a greater spacing, the light exit end of the light guide can be polished to a lenticular curved shape.

The lower face 265 of light exit head 260 is provided with recesses and limit stops for precise engagement and mounting to the support element.

The upper face 266 of light exit head 260 is provided with protrusions which allow to easily connect the transparent protective cover (not shown).

Both embodiments have in common that the respective light exit end of the light guide only has a plane ground end surface and can therefore be produced very easily and cost-efficiently. In particular, there is no need for oblique cuts to be produced by complex machining as required when a plurality of light guides are used.

In the embodiments, the light guide 250 has a quartz glass fiber core and a quartz glass fiber sheath, with a refractive index of the fiber sheath being lower than the refractive index of the fiber core. Due to its comparatively high temperature resistance, such a light guide is more appropriate than light guides made of plastic materials, for example.

In the case of the two last mentioned embodiments, the support element and/or the light exit head may already constitute a part of a lighting device or may be configured as a part of a lighting device.

The structural separation allows functional separation to the effect that a different material can be selected for the support element holding the converter than for the light exit head. For example, a particularly temperature-stable material can thus be provided for the support element, such as a sintered material, preferably a metallic sintered material, while a different material can be provided for the light exit head, such as a plastic material. Thus, the light exit head can be produced more easily and at lower cost.

Accordingly, the support element is designed so that the heat generated in the converter can be dissipated and removed via the support element. Due to the structural separation, heat transfer to the light exit head can be reduced, so that the risk of damaging the light guiding fiber during operation is reduced. In this way, the useful lifetime of the fiber-optic conversion module can be extended.

In addition, the problem of bundling the light exiting from a plurality of light exit ends in confined spaces and of focusing it on a common light spot on the converter surface is eliminated, so that overall less installation space is required for the conversion module according to the invention.

According to yet another aspect of the invention, the object of providing a converter-cooling body assembly is achieved by a method for producing a converter-cooling body assembly which comprises an optical converter for at least partially converting light of a first wavelength into light of a second wavelength, and a cooling body.

Figure 25:
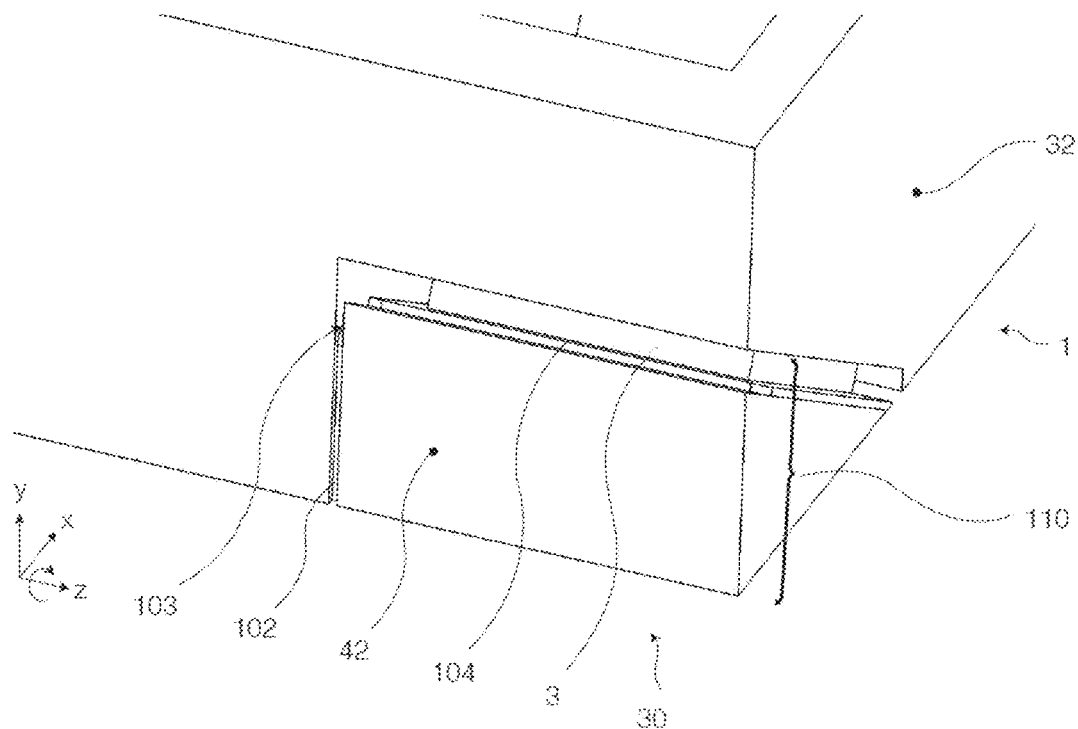
FIG. 25 is a perspective sectional front view, from a slightly elevated viewpoint, of a converter-cooling body assembly together with a further assembly of a first preferred embodiment, wherein the further assembly is the monolithic body of a light exit head of a fiber-optic conversion module.

Reference will be made to FIG. 25, which is perspective sectional front view, from a slightly elevated viewpoint, of components of a fiber-optic conversion module 1 illustrating a converter-cooling body assembly 110 along with a further assembly of a first preferred embodiment, wherein the further assembly is the monolithic body 32 of a light exit head 30 of fiber-optic conversion module 1.

By a first solder connection 101, the optical converter 3 is held on a cooling body 42, which in turn is held on monolithic body 32 by a second solder connection 102.

The optical, preferably ceramic, converter 3 may have a coating 104 which promotes the mechanical stability of the first solder connection 101 and improved dissipation of heat from optical converter 3.

This coating 104 is preferably a metal-containing reflective coating in order to dissipate heat and also to improve the conversion efficiency of optical converter 3 by reflecting the excitation light fractions scattered in the direction of coating 104.

The coating process for applying the coating 104 on optical converter 3 comprising a preferably ceramic body comprises at least the process steps a) to F).

In step a), an optical, in particular ceramic converter 3 is provided, which has at least one polished surface. The high temperature stability of the ceramic converter material of optical converter 3 allows not only to use primary light sources with high luminance (e.g. semiconductor lasers) but also high process temperatures in the subsequent process steps.

Step b) includes providing a metal-containing paste. The metal-containing paste comprises a metal powder in an organic pasting medium. In particular, the used organic pasting medium is a rheology additive which is a solution of resins and organic additives in a solvent mixture and/or which is dryable by IR (e.g. Johnson Matthey 650-63 IR Medium Oil-based, Okuno 5000). The pasting medium is used to adjust the rheology of the paste so that the paste is printable, for example.

The metal powder preferably contains at least one metal of the group that comprises the elements silver, gold, and platinum, or alloys thereof. In particular silver powder is used, which is particularly advantageous, since silver exhibits both high thermal conductivity and high reflectivity.

According to one embodiment, the metal paste provided in step b) contains a silver content of 70 wt % to 90 wt %, preferably 80 wt % to 85 wt %. The proportion of the organic pasting medium is 10 wt % to 30 wt %, preferably 15 wt % to 20 wt %.

Subsequently, the paste obtained in step b) is applied to at least a section of the polished converter surface (step c). The paste is preferably applied to the converter surface by a printing process, in particular by a screen printing process. In this way it is possible to produce a lateral pattern of the coating on the converter surface in a surprisingly simple manner. Therefore, it is also possible to print or omit only sections of the converter surface. Other printing processes are also possible, such as pad printing or roll printing processes.

In step d), the paste applied to the converter surface is dried. The paste is preferably dried at temperatures in a range from 150° C. to 400° C., particularly preferably at temperatures in a range from 250° C. to 300° C. As a result, the solvents in the pasting medium are at least partially removed and the applied paste is in particular pre-densified. The drying time depends on the solvent content in the applied paste and is typically between 5 min and 30 min.

In the subsequent step e), the applied paste is fired at temperatures >450° C., which leads to a good thermal and mechanical connection of the so formed coating to the converter. The high firing temperatures moreover cause sintering of the metal particles contained in the metal powder. The resulting sintered structure exhibits relatively high homogeneity and leads to the good reflection properties of the so obtained coating. In this case, firing temperatures in a range from 700° C. to 1000° C. have been found to be particularly advantageous.

Depending on the employed firing temperature and the employed metal powder, the metal powder may largely or partially melt according to one embodiment, so that the ceramic converter is wetted by the metal at the interface. According to further embodiments, the metal particles contained in the paste only sinter together.

During firing of the paste, the organic components of the applied paste and residues of the pasting medium will be burnt out.

The converter 3 coated with coating 104 in this manner is connected to cooling body 42 in step f) by forming a first solder connection 101, i.e. it is also mechanically fixed thereon by the first solder connection thus produced.

In this case, the cooling body 42 is soldered to the coating 104 obtained in step e) using the first solder, preferably a tin-containing lead-free solder. Preferred further first solders for first solder connection 101 will be described below in more detail.

According to a refinement, the paste provided in step b) additionally includes a glass content. The glass content leads to a better adhesion of the coating on the converter surface and to an improved sintering behavior of the metal particles to each other. The glass content moreover has a positive impact on the solderability of the metallic coating 104.

According to a further refinement, the metallic coating can be applied several times. For this purpose, paste is applied (step c) again, either after the drying of the paste (step d), or after the firing of the paste (step e), and is further processed as described above.

In one embodiment, the glass content is 0.05 wt % to 8 wt %, preferably 0.1 wt % to 6 wt %, more preferably 0.2 wt % to 5 wt %. This glass content has been found to be advantageous, since the glass content is sufficient to increase adhesion of the coating on the surface of the converter on the one hand, and on the other hand still ensures good solderability of the coating.

In this case, the use of glass powders having a particle size D50 in a range from 1 μm to 5 μm has been found to be advantageous, which ensures a homogeneous distribution of the glass particles in the paste and thus also a homogeneous distribution of the glass content in the coating obtained in step e).

According to one embodiment, the glass contained in the paste has a glass transition temperature Tg in a range from 300° C. to 600° C., preferably in a range from 350° C. to 560° C.

The glass powder used in step b) is preferably a PbO—, a $Bi_2O_3$—, a ZnO—, an $SO_3$—, or a silicate-based glass. These glasses have been found to be particularly advantageous in terms of their softening temperatures or their refractive index.

According to a particularly preferred embodiment, a silicate-based glass is used in step b), in particular a glass with a $SiO_2$ content of at least 25 wt %. In addition to advantageous refractive indices and softening temperatures, such glasses also exhibit high resistance to redox processes involving the metal and/or the ceramic converter, even under the firing conditions (step e) of the invention.

Figure 26:
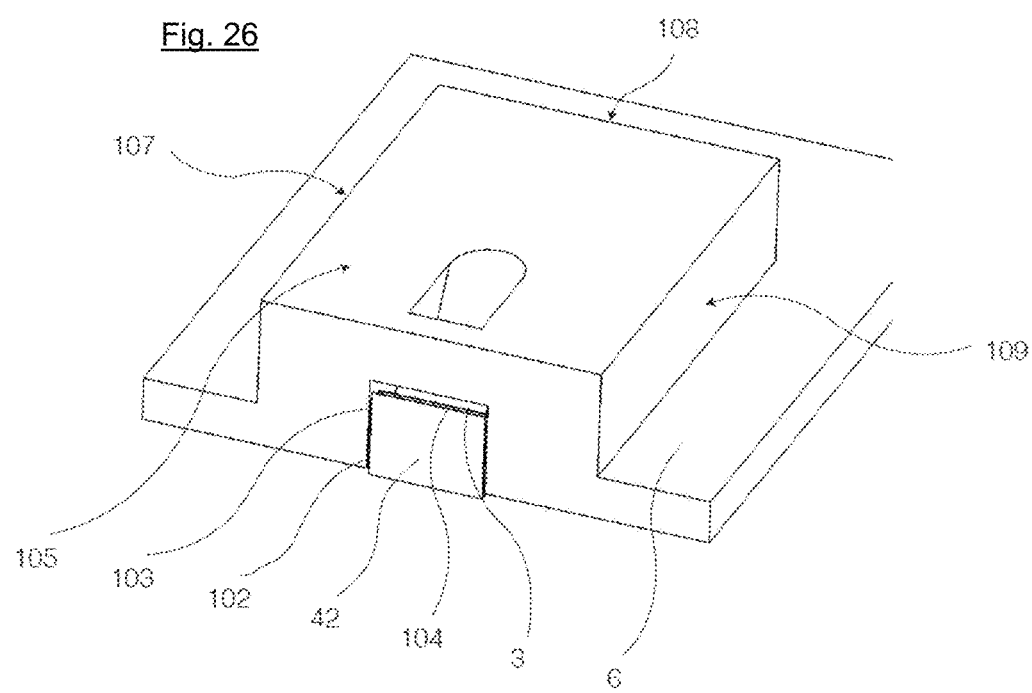
FIG. 26 is a perspective sectional front view, from a slightly elevated viewpoint, of an assembly of a light exit head of a fiber-optic conversion module, in which the converter-cooling body assembly shown in FIG. 1 is held by a second solder connection.

The coating 104 which is shown only in FIG. 26, for the sake of simplicity, may preferably be applied in all embodiments on the side of the optical converter 3 facing the solder connection 101, even though this coating 104 is not explicitly shown in each figure for the sake of simplicity.

The second solder connection 102 is capable of filling a gap 103 between monolithic body 32 and cooling body 42 and, in its softened state, allows displacement of the converter-cooling body assembly 110 at least in the directions x and y relative to monolithic body 32 or also a rotary or staggering movement around the z-axis shown in FIG. 26.

In this softened state of second solder 102, the converter-cooling body assembly 110 can be aligned in the x- and y-directions relative to monolithic body 32 with a few μm of lateral deviation, e.g. with less than 10 μm of lateral deviation, for example by means of a Hexapod which is well-known to persons skilled in the art but not shown in the figures. After this alignment, the converter-cooling body assembly 110 can be held mechanically stable at first by the hexapod and then by second solder connection 102, in particular after the temperature of the second solder connection was lowered below its melting point Tm2.

Figure 27:
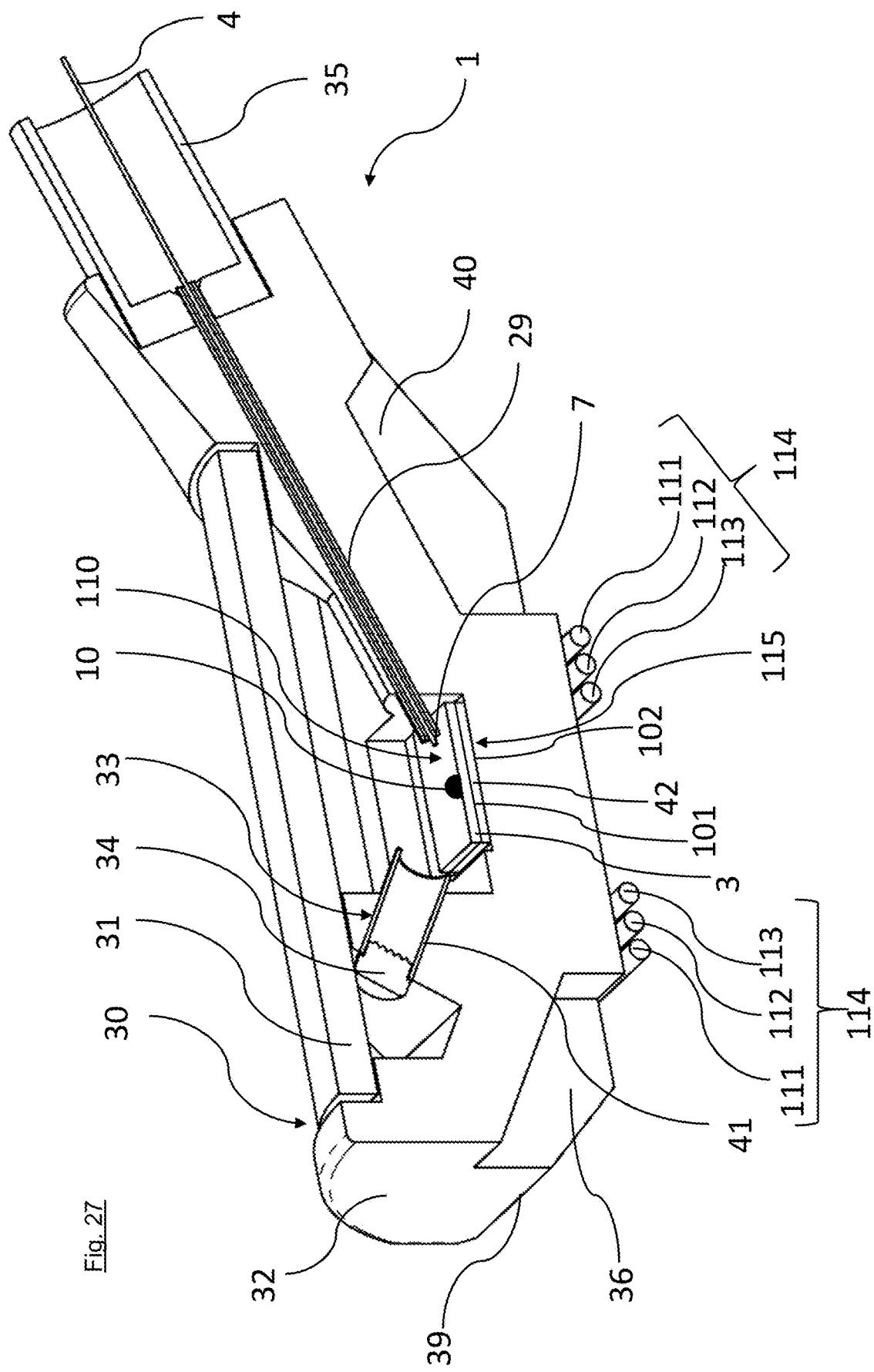
FIG. 27 is a horizontal perspective sectional view of a first embodiment of the light exit head shown in FIG. 3, cut through the center of the fiber-optical light exit head and through the center of the fiber of the fiber-optic conversion module.
Figure 28:
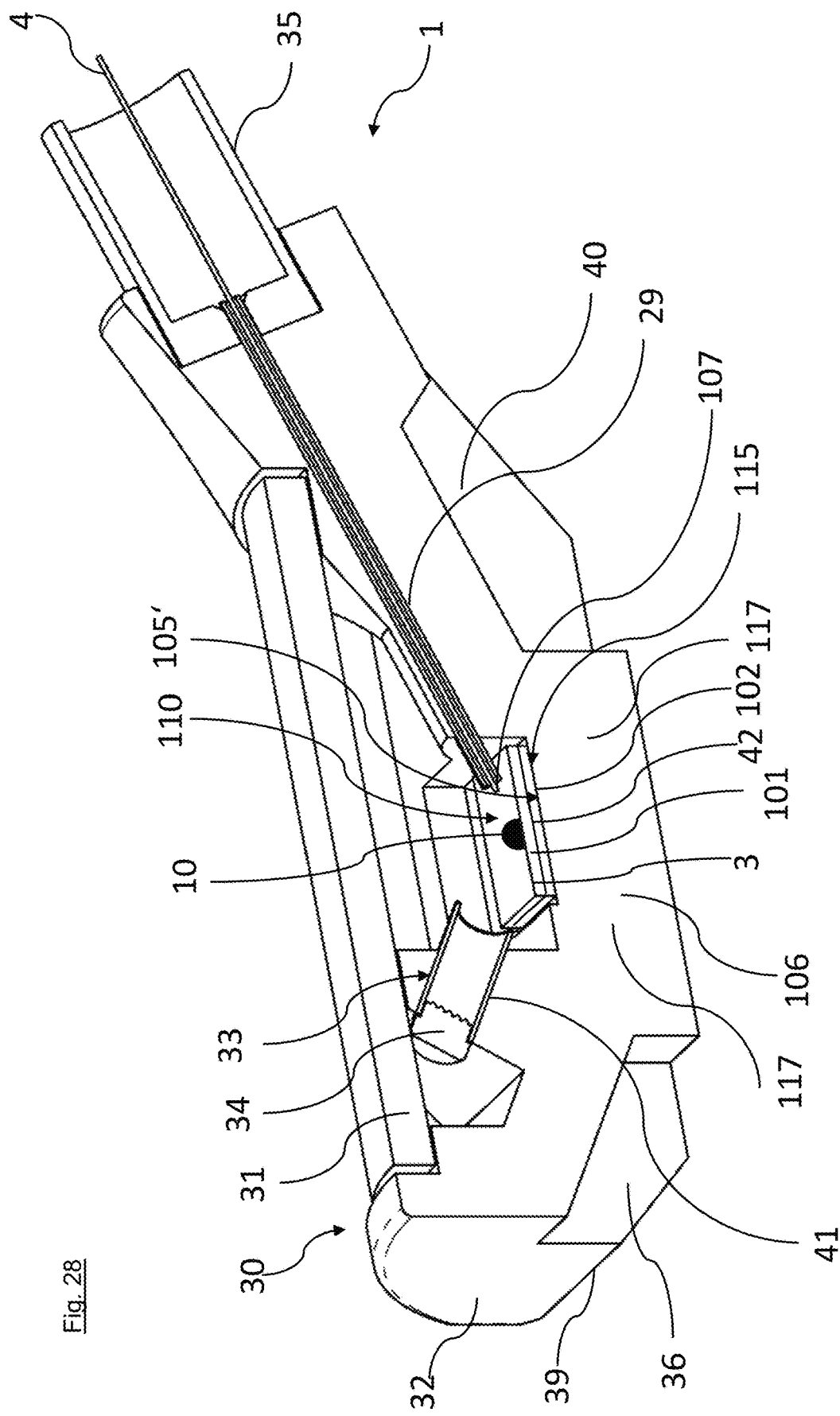
FIG. 28 is a horizontal perspective sectional view of a second embodiment of the light exit head shown in FIG. 3, cut through the center of the fiber-optical light exit head and through the center of the fiber of the fiber-optic conversion module.
Figure 29:
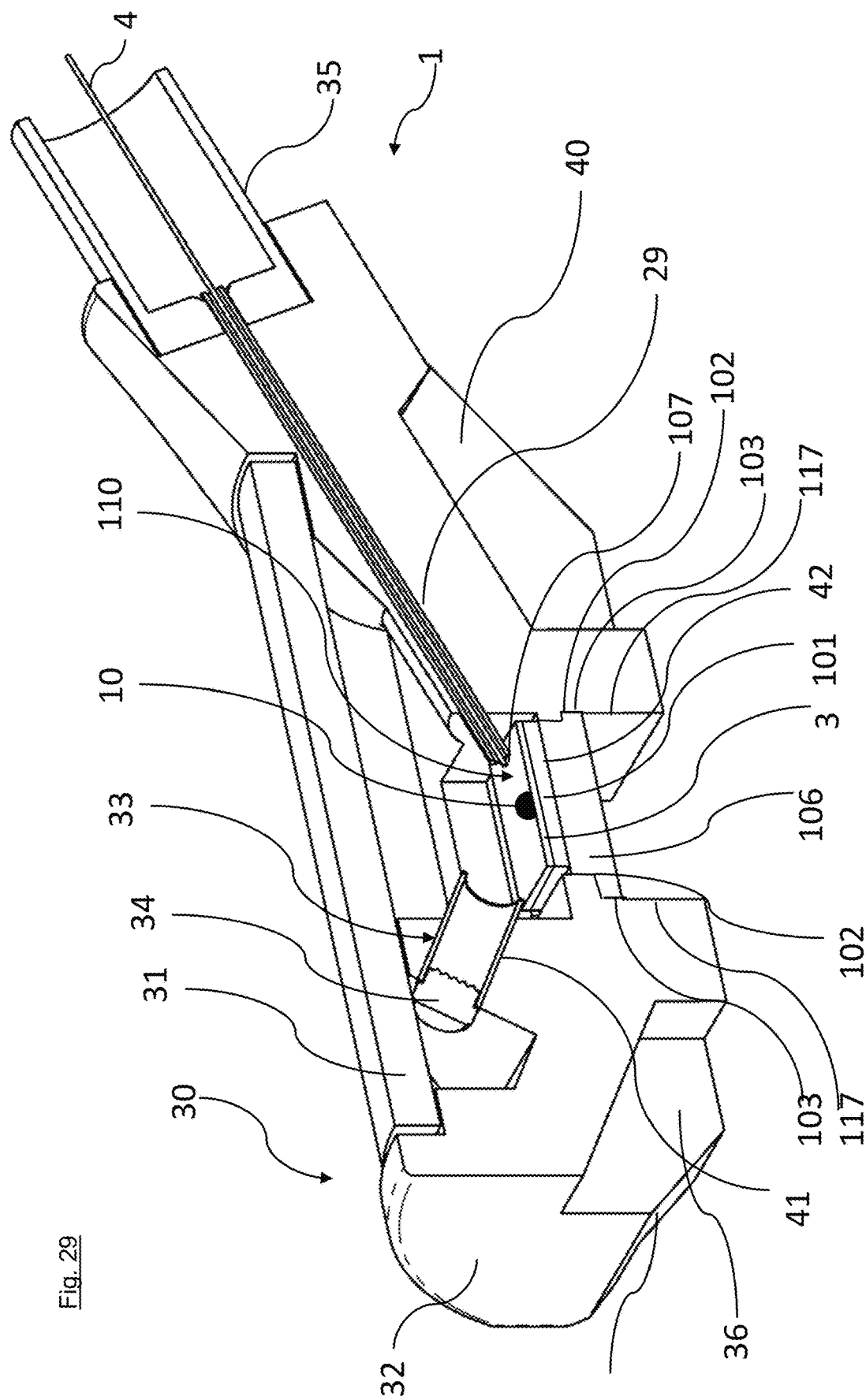
FIG. 29 is a horizontal perspective sectional view of a third embodiment of the light exit head shown in FIG. 3, cut through the center of the fiber-optical light exit head and through the center of the fiber of the fiber-optic conversion module.

When the converter-cooling body assembly is shifted, for example, by the same amount in the positive x- and y-directions, this reduces the spacing between the surface of optical converter 3 and exit surface 7 of an optical fiber 4 guiding the excitation light, as can be seen in FIGS. 27, 28, and 29, for example. By reducing this spacing, the size of light spot 10 on optical converter 3 is reduced, whereas increasing of the spacing between the surface of optical converter 3 and the exit surface 2 of fiber 4 increases the size of light spot 10. In this respect, reference is made to the application entitled "Verfahren zur Justierung eines auf einem optischen Konverter erzeugten Leuchtflecks sowie Vorrichtung mit justiertem Leuchtfleck und deren Verwendungen", which was filed by the same applicant at the same office at the same day, and is incorporated herein by reference and is referred to above as German Patent Application No. 102015113552.3 filed Aug. 17, 2015.

As mentioned above, the converter-cooling body assembly 110 can be rotated or tilted around the z-axis (see the illustration of FIG. 26), which allows to align the inclination of the surface of optical converter 3 on which the excitation light is incident. In this way it is possible to influence the direction of propagation of both the reflected excitation light and the main scattered lobe of the useful light and therefore to align it in a defined angular interval.

Reference will now be made to FIG. 26, which is a perspective sectional front view, from a slightly elevated viewpoint, of an assembly 105 of a light exit head 30 of a fiber-optic conversion module 1, in which the converter-cooling body assembly 101 of FIG. 25 is held by a second solder connection 102.

For example, this assembly may be part of the light exit head illustrated in FIG. 29, or of another one, as will be described below in more detail.

The assembly 105 has a substantially horizontally extending mating surface 106 and a pedestal-like elevation defined by horizontal mating surfaces 107, 108, 109, by means of which the assembly 105 can be installed with an accurate fit while preserving the alignment of the converter-cooling body assembly 110 relative to the assembly 105.

For a better understanding, a particularly preferred embodiment will be described below, in which the converter-cooling body assembly is connected, by the second solder connection 102, to a light exit head 30 as a further assembly.

Reference will now be made to FIG. 9, which is a perspective schematic plan view of fiber-optical light exit head 30 of a fiber-optic conversion module 1 of a first embodiment viewed obliquely from above.

The optical converter 3, the holder 29 for fiber 4 with the fiber 4 arranged therein can be seen underneath a protective cover made of glass 31 which is arranged as an elongated sleeve in a monolithic body 32 and carries both fiber 4 with its holder 29 and the optical converter 3.

Monolithic body 32 also supports a light trap 33 which has a plug-like element 34 at its end, which can be seen in FIG. 9.

By means of a sleeve 35 arranged in monolithic body 32, the fiber 4 can be retained on light exit head 30 in a mechanically reliably manner.

A fitting feature in the form of a rectangular recess 36 is provided on the lower face of monolithic body 32, which together with bevels 37, 38, and 39 of defined dimensions allows to mount the light exit head 30 on further assemblies (not shown in the figures) in a correct position. Thus, the position of the light spot 10 with high mechanical precision can also be used in the further assemblies (not shown), and the fitting feature 36 as well as the bevels 37, 38, and 39 are produced with mechanical tolerances of less than 50 μm, preferably less than 10 μm.

A further rectangular recess 40 which is provided in the monolithic body 32 can be seen in FIG. 27 which is a horizontal perspective sectional view of the light exit head 30 shown in FIG. 9, cut through the center of the fiber-optical light exit head 30 and through the center of the fiber 4 of the fiber-optic conversion module.

For the sake of simplicity, FIG. 27 only shows the fiber core of fiber 4. In this and all other embodiments described herein, the diameter of the light guiding core of the fiber may generally be about 3 μm to 1500 μm, preferably about 3.5 μm to 1000 μm, and most preferably about 50 μm to 150 μm.

As can be seen from FIG. 27, the light trap 33 comprises a sleeve 41 that is held in monolithic body 32 and accommodates the element 34 which is inserted into sleeve 41 in the form of a plug and can be attached to this sleeve due to a mechanical fit by press fitting, gluing, soldering, or else screwing. Sleeve 40 may have a blackened or roughened inner surface or may be provided with light traps (not shown in the figures), which may extend radially in the sleeve with a triangular profile.

The longitudinal or symmetry axis of sleeve 40 is oriented towards the light spot 10 of optical converter 3 and extends at an angle that corresponds to the reflection angle of the excitation light exiting from fiber 4 and reflected at optical converter 3. Thus, substantially all of the excitation light that is reflected by optical converter 3 is received by the sleeve 40 of light trap 33.

In the preferred embodiments, both the fiber 4 in its holder 29 and the optical converter 3 are arranged in the monolithic body 32 before and after the alignment, which monolithic body is preferably produced by a powder metallurgical injection molding process, in particular by a metal injection molding (MIM) process and is therefore capable of providing high mechanical strength along with good thermal conductivity.

Due to windings 111, 112, 113 of an induction coil 114, which are only shown in a sectional view in FIG. 27, the monolithic body 32 can be heated in a defined manner, so that the converter-cooling body assembly 110 can be brought to a temperature greater than Tm2 and lower than Tm1, and so that this assembly 110 can be mounted to the monolithic body 32 due to the softened solder connection 102, and can moreover be aligned relative to the monolithic body 32 after having been mounted when being reheated to this temperature.

This type of heating is not limited to the embodiment described above, but may be performed in any of the embodiments described herein. It is also possible to heat only the converter-cooling body assembly, e.g. the arrangement shown in FIG. 30 comprising a cooling body 42 and a multitude of optical converters 3.

The first solder connection 101 between optical converter 3 and cooling body 42 and the second solder connection 102 between the cooling body and the monolithic body 32 provide for both a mechanically firm hold and good thermal conductivity, so that the temperature of optical converter 3 is not higher than 170° C. to 190° C. during operation. In this case, the heat to be dissipated can also be transferred through the monolithic body 32 to further assemblies (not shown in the figures).

The thermal conductivity) of monolithic body 32 together with cooling body 42 is greater than 200 W/(m*K) and is preferably greater than 350 W/(m*K).

In this embodiment shown in FIG. 27, the converter-cooling body assembly is held on a planar bottom surface 115 of monolithic body 32 by the second solder connection 102.

According to further preferred embodiments, however, an assembly 105' similar to the assembly 105 of FIG. 26 may likewise carry the converter-cooling body assembly in pre-aligned manner, and can provide an aligned arrangement within fiber-optical light exit head 30 by assembling this assembly 105' to the monolithic body 32 in an accurately fitting manner. For this purpose, the assembly 105' simply has to be inserted into monolithic body 32, as will be described below in more detail with reference to FIGS. 28 and 29.

A particular advantage of these embodiments is the flexible usage of the converter-cooling body assembly 110. For example, pre-assembled fiber-optical light exit heads 30 can be produced in large quantities at low cost, and can be equipped with selected prefabricated converter-cooling body assemblies 110.

For different spectral tolerance ranges, for example for motor vehicle headlights of different manufacturers having their proprietary tolerance ranges, it is then possible to mount respective spectrally selected converter-cooling body assemblies 110 associated with the respective manufacturer to the monolithic body 32, in order to provide a fiber-optic conversion module in compliance with the manufacturer's specifications. In this way it is possible to flexibly meet customer-specific requirements, and only the respective converter-cooling body assemblies 110 need to be customized and stocked.

Reference will now be made to FIG. 28, which is a horizontal perspective sectional view of the light exit head 30 of a second embodiment shown in FIG. 9, cut through the center of the fiber-optical light exit head 30 and through the center of the fiber 4 of fiber-optic conversion module 1.

This embodiment differs from the one described above in that the converter-cooling body assembly 110 is arranged on a support 116, on which this arrangement is held by the second solder connection 102, and along with this support 116 it defines the assembly 105' which can be handled separately and which can be inserted into an associated accurately fitting recess 117 of the monolithic body, so that with the alignments that have already been performed for optical converter 3 an already final and correctly aligned light exit head 30 is obtained while preserving this previous alignments. In this case, the pedestal-like shape of support 116 also has a heat dissipating effect, since the support 116 may also be held in the monolithic body 32 by the second solder connection, and can transfer the heat absorbed by cooling body 42 thereto.

In the third embodiment shown in FIG. 29, the cooling body 42 itself is furthermore laterally accommodated in the accurately fitting recess 117 and functionally replaces the support 116 by virtue of its shape. In this embodiment, the assembly 105' thus corresponds to the converter-cooling body assembly 110, and the latter is held on monolithic body 32 by the second solder connection 102. For this purpose, it has a shape that differs from the one of the embodiment illustrated in FIG. 26, in order to be held on the monolithic body 32 in a defined and aligned manner laterally and in its insertion direction by the second solder connection 102, which is helpful for serial production, because further alignments can be dispensed with in this case, in particular if the accurate fit in recess 117 already provides the tolerances required for a finally aligned state.

Alternatively, the recess 117 may be larger than the lateral dimensions of assembly 105' and may define a gap 103 which is filled with the second solder. In this case, the second solder connection 102 with a clearance defined by gap 103 can allow for the alignment of the position of the assembly 105' and thus the alignment of the position of optical converter 3. For this purpose, a Hexapod (not shown in the figures) may carry the assembly 105' or 110 and hold it in correct alignment at least until the second solder connection has been produced.

Figure 30:
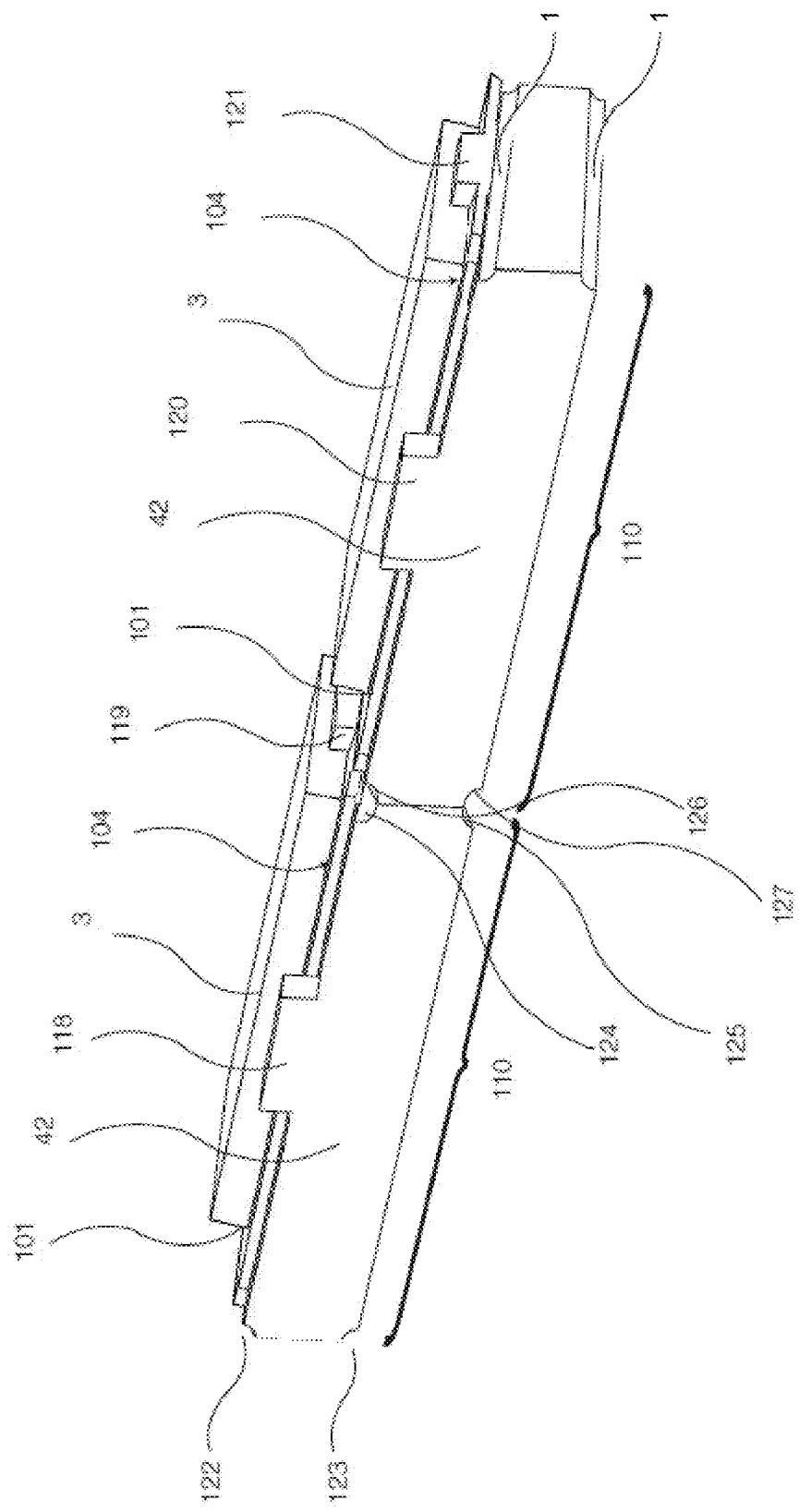
FIG. 30 shows a converter-cooling assembly in which a multitude of optical converters are mounted on at least one cooling body, so that they can be heated together with the at least one cooling body.

FIG. 30 shows a converter-cooling body assembly 105', 110, in which a multitude of optical converters 3 are mounted on at least one cooling body 42, so that they can be heated together with the at least one cooling body 42 to a temperature that is greater than Tm1 and thereby the first solder connection 101 can be produced.

For the correct positioning of optical converter 3 relative to cooling body 42, respective protrusions 118, 119, 120, 121 may protrude from cooling body 42, which laterally embrace the optical converter 3 in an accurately fitting manner and thereby ensure its laterally correctly aligned position.

After the first solder connection 101 has been produced, respective converter-cooling body assemblies 110 can then be severed and thereby separated, preferably along the lines that are mechanically weakened by grooves 122 to 129.

In all the embodiments described above, the first solder connection 101 is produced at first, preferably at a temperature higher than or equal to Tm1, and subsequently the second solder connection 102 is produced.

Thereafter, but not necessarily in immediate succession, the second solder connection 102 is produced at a temperature greater than Tm2 and not permanently exceeding Tm1, so that the first solder connection 101 is not weakened to such an extent to significantly change the arrangement of optical converter 3 relative to cooling body 42, at least while the second solder connection 102 is produced.

If material of the fiber 4 might be thermally damaged due to the temperature increase associated with the producing of the solder connections, for example in the first embodiment, it is also possible to assemble this fiber 4 with its holder 29 to monolithic body 32 only after the first and/or second solder connections 101, 102 have been produced.

In a preferred embodiment of the production method, the heating of the arrangement comprising at least one optical converter 3 and at least one cooling body 42 for producing the respective solder connection can be accomplished by placing it into a furnace at a temperature greater than Tm1 or Tm2, and the minimum retention time of the arrangement of at least one optical converter and at least one cooling body in the furnace allows to achieve a temperature equilibrium state.

Such furnaces are well known to persons skilled in the art and are therefore not illustrated in the figures.

Alternatively or in addition to the embodiment described above, heating of the arrangement comprising at least one optical converter 3 and at least one cooling body 42 may be accomplished by local heating, in particular through mechanical thermal contact, e.g. through contact with a preferably thermally controlled heating element 114, through contact with a heated body, e.g. a heated monolithic body 32 which carries prepositioned assemblies and is itself inductively heated, for example.

The assemblies illustrated in FIG. 30 can also be heated in this way.

Heating of the arrangement comprising at least one optical converter and at least one cooling body can be accomplished by local heating, in particular heating by radiation, focused thermal radiation, laser radiation, in particular also pulsed laser radiation.

Heating of the arrangement comprising at least one optical converter 3, at least one cooling body 42, and preferably a further optical assembly 32 for producing the respective solder connection 101, 102 may also be accomplished at reduced ambient pressure and in particular if reduced ambient pressure prevails until the respective solder connection 101, 102 has been produced.

In this case, the melting point Tm1 is between 250° C. and 450° C., preferably between 280° C. and 320° C., and more preferably at about 300° C., and the melting point Tm2 is between 150° C. and 245° C., preferably between 180° C. and 230° C., and more preferably at about 220° C.

The first solder may be an Ag/Au solder, and the second solder an Ag/Sn solder.

The cooling body 42 may comprise steel, aluminum, copper, and/or bronze alloys, and may in particular be produced by a metal injection molding (MIM) process.

Particularly advantageously, the fiber-optic conversion modules described above can be used in vehicle headlights or can form a part of vehicle headlights, even as an integral assembly, since they provide perfectly well aligned units that are usually permanently stable against mechanical and thermal influences in continuous operation.

LIST OF REFERENCE NUMERALS

| | |
|---|---|
| 1 | Fiber-optic conversion module |
| 2 | Light guide |
| 3 | Optical converter |
| 4 | Fiber-optical waveguide, fiber |
| 5 | Excitation light |
| 6 | Normal of exit surface |
| 7 | Exit surface |
| 8 | Longitudinal axis of the fiber 4 |
| 9 | Main ray |
| 10 | Light spot |
| 11 | Useful light |
| 12 | Opening cone of useful light 11 |
| 13 | Marginal ray of useful light cone 12 |
| 14 | Marginal ray of useful light cone 12 |
| 15 | Light guiding optical fiber |
| 16 | Main ray of light exiting from fiber 15 |
| 17 | Holder for fiber 15 |
| 18 | Light guiding optical fiber |
| 19 | Main ray of light exiting from fiber 18 |
| 20 | Holder for fiber 18 |
| 21 | Optical unit |
| 22 | Biconvex lens |
| 23 | $CO_2$ laser |
| 24 | Galvanometer scanner |
| 25 | Light of $CO_2$ laser |
| 26 | Focus of light of the $CO_2$ laser |
| 27 | Image capturing device |
| 28 | Process control device |
| 29 | Holder for fiber 4 |
| 30 | Light exit head |
| 31 | Protective cover made of glass |
| 32 | Monolithic body |
| 33 | Light trap |
| 34 | Element of light trap |
| 35 | Sleeve |
| 35' | Sleeve |
| 36 | Rectangular recess |
| 37 | Bevel |
| 38 | Bevel |
| 39 | Bevel |
| 40 | Rectangular recess |
| 41 | Sleeve |
| 42 | Cooling body |
| 43 | Flange |
| 44 | Limit stop |
| 45 | Scattering surface |
| 46 | Lateral surface |
| 47 | Lateral surface |
| 48 | Opening |
| 49 | Opening |
| 50 | Holder for optical converter |
| 51 | Framing features of the holder of optical converter |
| 52 | Framing features of the holder of optical converter |
| 53 | Protrusion |
| 54 | Protrusion |
| 55 | Length scale |
| 56 | Closed rounded end of protective cover made of glass |
| 57 | Open end of protective cover made of glass |
| 58 | Mating surface |
| 59 | Mating surface |
| 60 | Mating surface |
| 61 | Inclined surface |
| 62 | Inclined surface |
| 63 | Frustoconical opening |
| 64 | Passage opening |
| 65 | Groove |
| 66 | Reflected excitation light |
| 67 | Fresnel zone plate |
| 68 | Opening |
| 69 | Lateral wall |
| 70 | Bottom surface |
| 101 | First solder connection |
| 102 | Second solder connection |

-continued

| | |
|---|---|
| 103 | Gap |
| 104 | Coating |
| 105 | Assembly |
| 105' | Assembly |
| 106 | Mating surface |
| 107 | Mating surface |
| 108 | Mating surface |
| 109 | Mating surface |
| 110 | Converter-cooling body assembly |
| 111 | Winding |
| 112 | Winding |
| 113 | Winding |
| 114 | Induction coil, heating element |
| 116 | Support |
| 117 | Recess |
| 118 | Protrusion |
| 119 | Protrusion |
| 120 | Protrusion |
| 121 | Protrusion |
| 122 | Groove |
| 123 | Groove |
| 124 | Groove |
| 125 | Groove |
| 126 | Groove |
| 127 | Groove |
| 128 | Groove |
| 129 | Groove |
| 200 | Lighting device |
| 220 | Support element |
| 221 | Converter |
| 222 | Light shield |
| 223 | Reflecting surface |
| 224 | Protective cover |
| 225 | Recess |
| 226 | Limit stop |
| 227 | Bore |
| 230 | Light exit head |
| 231 | Insert element |
| 232 | Insert element |
| 233 | Spacer |
| 234 | Protrusion |
| 235 | Mounting shaft |
| 240 | Optical element |
| 250 | Fiber-optical light guide |
| 260 | Light exit head |
| 261 | Reflector |
| 262 | Circular opening |
| 263 | Slit |
| 264 | Optical element |
| 265 | Lower face |
| 266 | Upper face |

What is claimed is:

1. A method for producing a converter-cooling body assembly, comprising:
directly coating at least parts of a surface of an optical converter with a metal-containing reflective coating, the optical converter at least partially converting light of a first wavelength into light of a second wavelength;
connecting a cooling body to the metal-containing reflective coating so that the metal-containing reflective coating dissipates heat from the optical converter into the cooling body; and
connecting the cooling body and/or the optical converter to a light exit head.

2. The method of claim 1, wherein the step of connecting the cooling body to the metal-containing reflective coating comprises soldering, using a metallic solder the cooling body to the metal-containing reflective coating.

3. The method of claim 1, wherein the step of connecting the cooling body and/or the optical converter to the light exit head comprises soldering, using a further metallic solder the cooling body and/or the optical converter to the metal-containing reflective coating.

4. A converter-cooling body assembly, comprising:
a metal-containing reflective coating;
an optical converter for at least partially converting light of a first wavelength into light of a second wavelength, at least a section of the optical converter is directly coated with the metal-containing reflective coating;
a cooling body connected to the optical converter at the metal-containing reflective coating so that the metal-containing reflective coating dissipates heat from the optical converter into the cooling body; and
a light exit head connected to the cooling body and/or the optical converter.

5. The converter-cooling body assembly of claim 4, wherein the cooling body is connected to the optical converter at the metal-containing reflective coating through a metallic solder connection.

6. A converter-cooling body assembly, comprising:
a glass and metal-containing coating;
an optical converter for at least partially converting light of a first wavelength into light of a second wavelength, at least a section of the optical converter is directly coated with the glass and metal-containing coating;
a cooling body connected to the optical converter at the glass and metal-containing reflective coating so that the glass and metal-containing coating dissipates heat from the optical converter into the cooling body; and
a light exit head connected to the cooling body and/or the optical converter.

7. The converter-cooling body assembly of claim 6, wherein the glass and metal-containing reflective coating comprises a glass content of 0.05 wt % to 8 wt %.

8. The converter-cooling body assembly of claim 6, wherein the glass and metal-containing reflective coating comprises a glass content of 0.2 wt % to 5 wt %.

9. The converter-cooling body assembly of claim 6, wherein the glass and metal-containing reflective coating comprises a glass selected from a group consisting of a PbO-based glass, a $Bi_2O_3$-based glass, a ZnO-based glass, an $SO_3$-based glass, and a silicate-based glass.

10. The converter-cooling body assembly of claim 6, wherein the glass and metal-containing reflective coating comprises a silicate-based glass with a $SiO_2$ content of at least 25 wt %.

* * * * *